United States Patent
Wallerstorfer et al.

(10) Patent No.: US 8,202,418 B2
(45) Date of Patent: *Jun. 19, 2012

(54) TANK

(75) Inventors: Kurt Wallerstorfer, Strasswalchen (AT); Andreas Wawrla, Widnau (CH); Roland Scholz, Haan (DE)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 334 days.

This patent is subject to a terminal disclaimer.

(21) Appl. No.: 12/310,071

(22) PCT Filed: Aug. 10, 2007

(86) PCT No.: PCT/EP2007/007111
§ 371 (c)(1),
(2), (4) Date: Apr. 16, 2009

(87) PCT Pub. No.: WO2008/017508
PCT Pub. Date: Feb. 14, 2008

(65) Prior Publication Data
US 2009/0242473 A1  Oct. 1, 2009

(30) Foreign Application Priority Data
Aug. 10, 2006 (DE) .......... 10 2006 037 636

(51) Int. Cl.
*B01D 35/30* (2006.01)
*B01D 24/00* (2006.01)
(52) U.S. Cl. ........ 210/232; 210/807; 210/265; 210/268; 210/282; 210/287; 210/503
(58) Field of Classification Search .......... 210/135, 210/130
See application file for complete search history.

(56) References Cited

U.S. PATENT DOCUMENTS

| | | | |
|---|---|---|---|
| 3,206,033 A | 9/1965 | Kern, Jr. | |
| 4,969,996 A * | 11/1990 | Hankammer | 210/282 |
| 5,342,518 A | 8/1994 | Posner et al. | |
| 5,897,770 A * | 4/1999 | Hatch et al. | 210/101 |
| 6,576,129 B1 | 6/2003 | Reid | |
| 2002/0144937 A1 | 10/2002 | Wilberscheid | |
| 2002/0170279 A1 | 11/2002 | Gustafson | |
| 2004/0129627 A1 | 7/2004 | McGibbon | |
| 2004/0182777 A1 | 9/2004 | Stankowski | |
| 2004/0211931 A1 | 10/2004 | Olson | |

(Continued)

FOREIGN PATENT DOCUMENTS
CH   432 395   9/1967
(Continued)

*Primary Examiner* — Krishnan S Menon
*Assistant Examiner* — Allison M Gionta
(74) *Attorney, Agent, or Firm* — Breneman & Georges

(57) ABSTRACT

A tank filter combination is provided for appliances which use water, in particular domestic appliances or appliances for preparation of foodstuffs and/or drinks, such as automatic drinks machines, in particular automatic coffee machines, drinking water dispensers, cooking and baking appliances, steamers, in particular steam irons, steam cleaners, high-pressure cleaners, air cleaners and air conditioners, etc. having a suction connection on the tank for suction of water from the tank at a reduced pressure, and a filter connection for connection of a filter cartridge in the interior of and/or outside the tank to ensure use of a permissible filter type. A filter cartridge according to the invention is distinguished by mechanical coding structures with a polygonal structure on the circumferential surface on the output side of the filter cartridge to prevent the use of a filter cartridge which does not correspond to the tank.

17 Claims, 36 Drawing Sheets

U.S. PATENT DOCUMENTS

Figure 1:
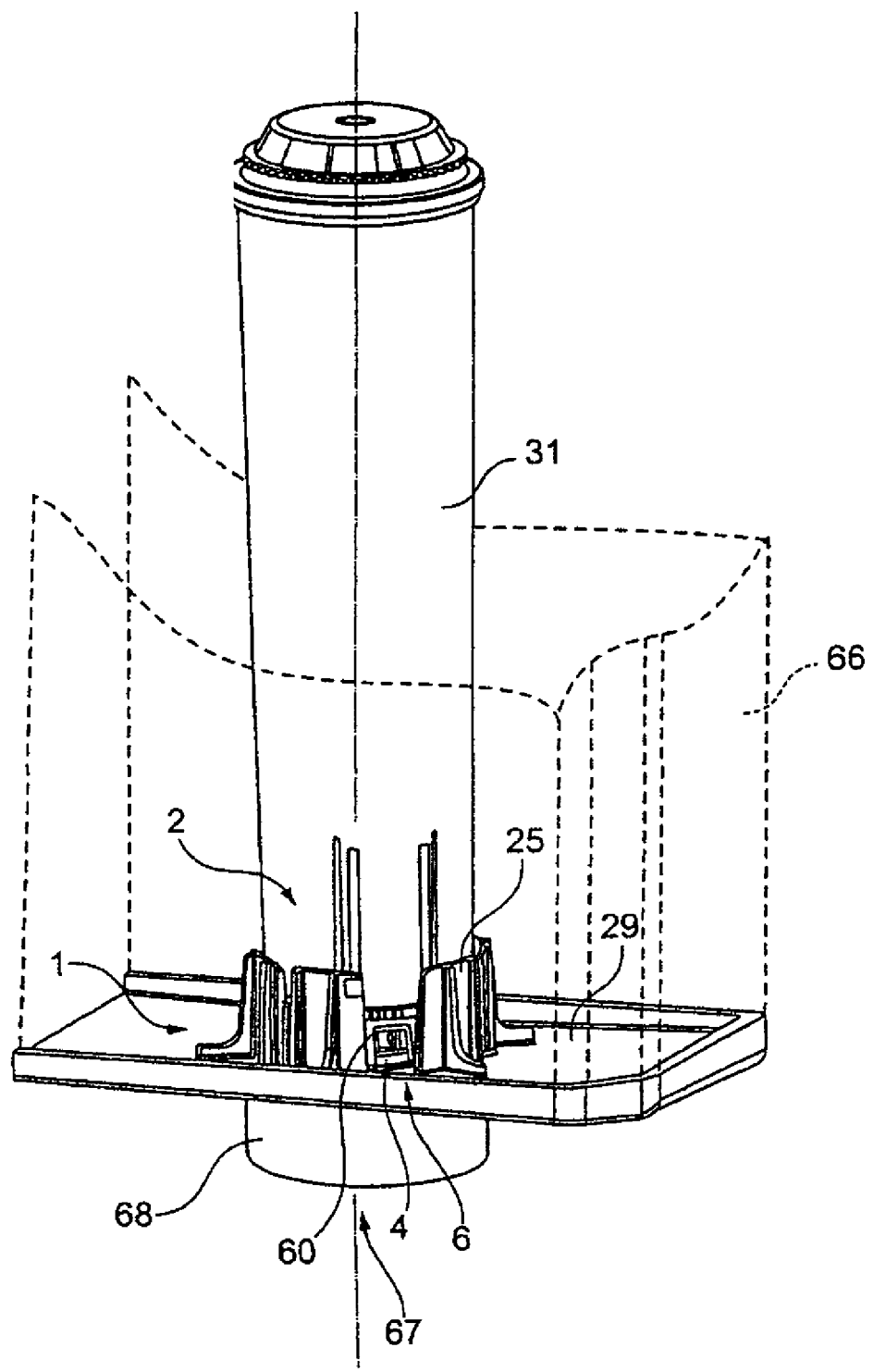

2006/0054547 A1 * 3/2006 Richmond et al. ............ 210/234

FOREIGN PATENT DOCUMENTS

| | | |
|---|---|---|
| DE | 30 14 493 A1 | 10/1981 |
| DE | 691 05 539 T2 | 8/1991 |
| DE | 196 48 405 A1 | 10/1998 |
| DE | 197 17 054 C2 | 11/1998 |
| DE | 198 27 623 A1 | 1/1999 |
| DE | 198 27 297 A1 | 12/1999 |
| DE | 203 80 258 U1 | 4/2005 |
| DE | 10 2004 026188 A1 | 12/2005 |
| DE | 10 2004 049877 A1 | 4/2006 |
| GB | 2 346 568 A | 8/2000 |
| RU | 2 131 695 C1 | 6/1999 |
| WO | WO 01/80967 A1 | 11/2001 |
| WO | WO 02/13944 A2 | 2/2002 |
| WO | WO 2004/014519 A2 | 2/2004 |
| WO | WO 2006/040120 | 4/2006 |
| WO | WO2006/050114 | 5/2006 |
| WO | WO 2006/050114 A1 | 5/2006 |
| WO | WO 2008/049547 A2 | 5/2008 |

* cited by examiner

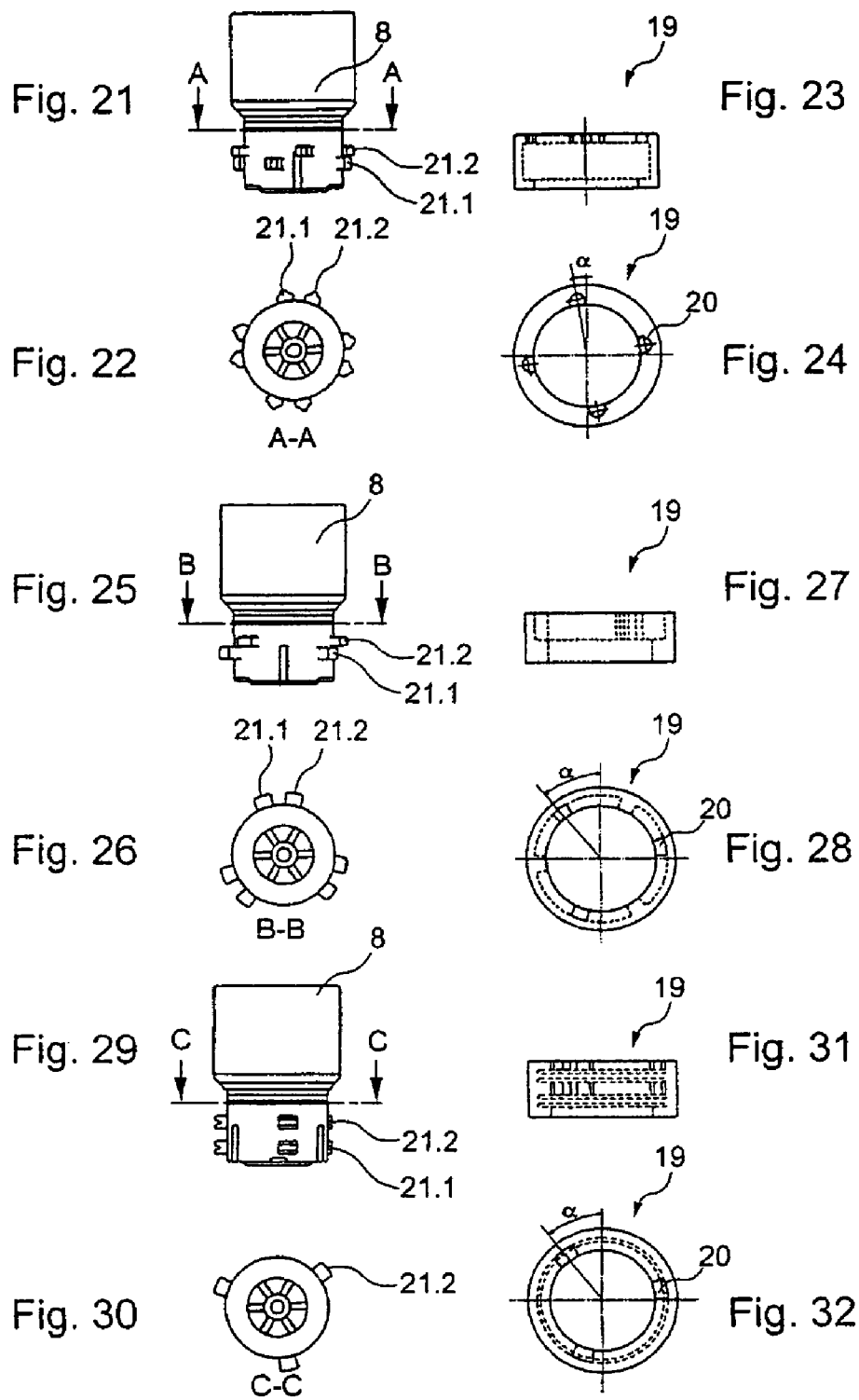

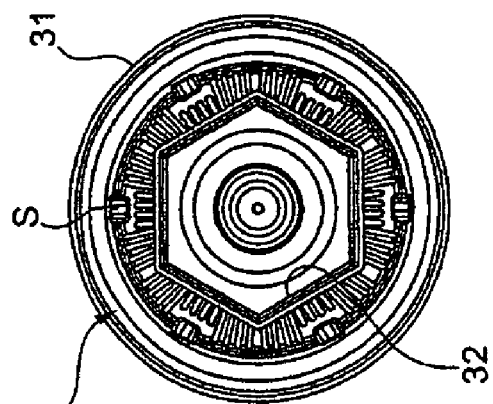
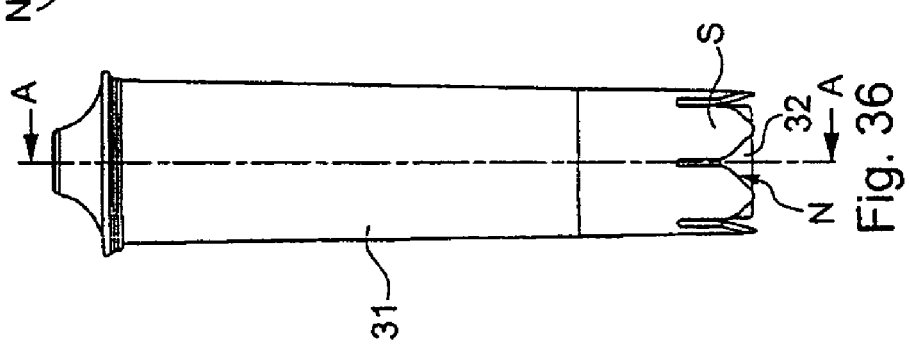
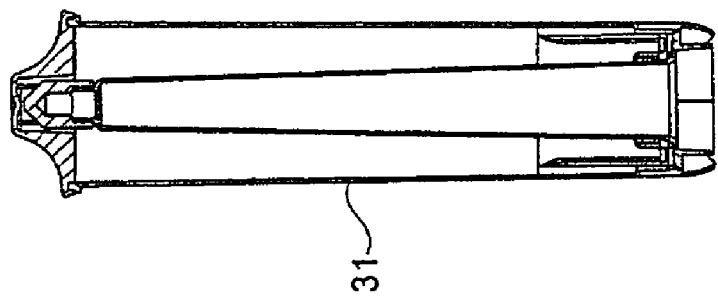
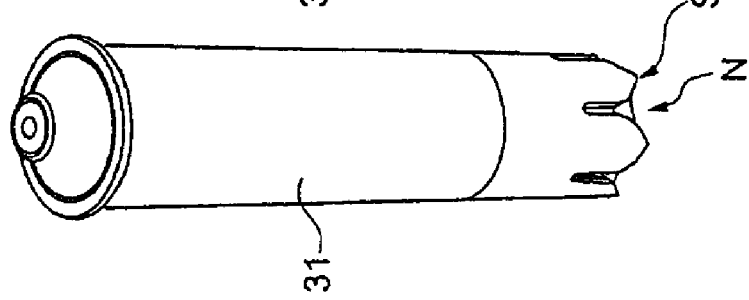
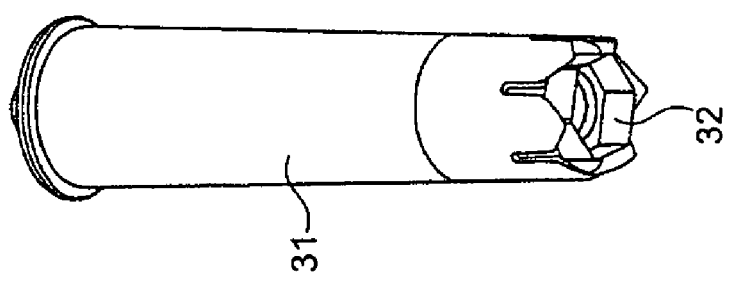

TANK

CROSS REFERENCE TO RELATED APPLICATIONS

The subject matter of this application is related to the subject matter of U.S. application Ser. No. 12/310,061 filed Feb. 10, 2009; U.S. application Ser. No. 12/310,062 filed Feb. 10, 2009; U.S. application Ser. No. 12/310,072 filed Feb. 10, 2009 and U.S. application Ser. No. 12/310,037 filed Apr. 23, 2009.

BACKGROUND OF THE INVENTION (1) Field of the Invention

The invention relates to a water filter cartridge and to a tank having a filter cartridge, as well as to a line-connected connecting head for a water filter cartridge with a connecting element for plugging into a tank, a filter cartridge, an appliance or a water filter connecting head. More particularly the invention pertains to a connecting element which is part of a tank, filter cartridge, appliance or a connecting head which has a polygonal contour.

(2) Description of Related Art Including Information Disclosed Under 37 CFR 1.97 and 1.98

A water tank to hold a liquid, to hold water in the case of kitchen equipment, coffee machines or espresso machines, is provided in various kitchen equipment and machines, for example in water filter jugs, water boilers, coffee or espresso machines, in which case a filter cartridge can be inserted into the tank, in order to prepare the water before processing in the machine or before consumption. Known filter cartridges have an outlet in the lower area, through which outlet the water is supplied to the associated machine or to a storage or reservoir vessel. In this case, the water is passed via a preferably gravimetrically operated filter bed, and is passed via a connection of the filter cartridge to a corresponding connection of the water tank, into the machine or some other reservoir and storage vessel.

For reliable operation of the kitchen equipment and machine, it is of major importance that a filter cartridge with defined filter parameters is used. An incorrect filter cartridge will result in the machine being supplied with inadequately or incorrectly prepared water, which can lead to negative effects, for example inadequate taste and/or smell optimization, calcium reduction or the like, or even to machine defects. The machine control system is, for example, not able to initiate the intended servicing intervals at the correct time, as when using a filter cartridge of the correct type, if such a filter cartridge is not actually used, however. When using inadequate filter cartridges, problems arise not only in the operational reliability of the machine but also in the question of the guarantee, etc. It is therefore of major importance to ensure that only permissible filter cartridges are ever used.

BRIEF SUMMARY OF THE INVENTION

The invention therefore has the object of providing a filter cartridge, a tank and a line-connected connecting head for a filter cartridge, which ensure that only the permissible filter type is used.

A water filter cartridge according to the invention comprises a connecting element on the filter output side which is intended for connection to a connecting structure of complementary design. The water filter cartridge is distinguished in that this connecting element has an internal and/or an external circumferential surface with a polygonal contour. This polygonal contour therefore represents a coding element which ensures that the filter cartridge can be connected, in such a manner that they can operate, only to a correspondingly complementary, likewise polygonal connecting structure.

It is particularly advantageous in this case for the two complementary polygonal connecting structures to produce a sealing effect between them when the filter cartridge is inserted. The sealing effect can in this case preferably be produced by an interlocking seal between these two polygonal connecting elements. However, the use of a physically autonomous seal may also advantageously be provided, additionally and/or alternatively. In order to achieve the sealing effect, a sealing surface can be provided which is aligned axially and/or radially and/or also at an angle to a longitudinal axis which runs through the filter-side connecting element.

In addition to this function of separating the two water areas, in the form of a seal between an area for the untreated water to be filtered by the filter cartridge and the area in which the water which has been filtered by the filter cartridge emerges from its outlet for further use, this polygonal connecting element of the filter cartridge may at the same time also be in the form of fixing means for fixing the filter cartridge. If required, even more supplementary coding and/or fixing structures can be provided on the water filter cartridge, which are provided with correspondingly complementary coding and/or fixing structures on the connecting element, which is complementary to the filter-side connecting element, of a tank or of a connecting head.

Depending on the embodiment, the connecting element of the filter cartridge may be both in the form of a projection and in the form of a recess, which can be connected in a corresponding manner to the complementary connecting structure by plugging in and/or plugging over, in which case an external circumferential surface with a polygonal contour of the water filter cartridge in each case preferably rests on an internal circumferential surface with a polygonal contour of the complementary connecting piece, forming a seal between them, or conversely, an internal circumferential surface of the filter-side connecting element rests on an external circumferential surface of the complementary connecting element.

However, alternatively or additionally, an end seal is also possible between a connecting element, which has a polygonal contour, of the water filter cartridge and a complementary connecting element, in order to hold the water filter cartridge, preferably by the formation of correspondingly flat end contact surfaces, possibly also assisted by a seal which is arranged in between and, for example, may be produced from an elastic material.

Axially and/or radially aligned additional coding structures can also be provided as a further coding capability on a connecting element such as this of the water filter cartridge and, for example, may likewise be in the form of projections and/or recesses. When using a seal between a filter-side connecting element which is coded in this way and a mating piece which is coded in a correspondingly complementary manner, the seal is preferably also provided with such additional coding structures.

The connecting element, which is complementary to the filter-side connecting element described above, for holding the water filter cartridge may, for example, be formed on a water tank which is intended to hold water to be filtered. This water tank may have an outlet for direct emission of the water to be filtered, although it may also be in the form of a tank for an appliance which uses water, in particular such as domestic appliances, such as automatic drinks machines, in particular automatic coffee machines, drinking water dispensers, cooking and baking appliances, steamers, in particular steam irons, steam cleaners, high-pressure cleaners, air cleaners and air conditioners or the like, wherein a suction connection can preferably also be provided on the tank for suction of water from the water tank, with means for production of a reduced pressure.

According to the invention, the expression "a tank" means not only a vessel which is intended for water storage but also any other apparatus which produces a hydrostatic pressure that is sufficient to operate the filter cartridge, for example an open and/or closed flow path.

In order to explain further details, a tank having a correspondingly connected filter element will be described in more detail, as one preferred embodiment, in the following text. A coding such as this between a connecting element of the water filter cartridge and a complementary connecting element for holding the water filter cartridge may, however, also invariably be used for line-connected embodiments, for example for a line-connected filter connecting head. All the features which are described in the following text with reference to a water tank and its connection to a corresponding water filter cartridge accordingly also apply in principle to a line-connected embodiment.

Accordingly, a tank according to the invention for appliances which use water and having a filter connection for connection of a filter cartridge to the tank is distinguished in that the shape of the circumference of the tank-side filter connection in particular provides a coding structure in such a way that the filter connection of the tank has a circumferential contour in the form of a polygon train. On the one hand, this makes it possible to prevent the use of a filter cartridge which does not correspond to the tank and on the other hand a seal can also be produced between the tank-side connection and the filter-side connection by means of an interlocking contact of a complementary, filter-side connecting element.

The tank-side filter connection is preferably located in the interior of the tank. Depending on the application, the tank-side filter connection may, however, also be provided externally on the tank, which may be advantageous, for example, with regard to assembly and/or hygiene.

The expression "a tank-side filter connecting element such as this" should be understood according to the invention as meaning all elements which are arranged and/or formed directly and/or indirectly on the tank, such as projecting and/or recessed holding and/or fixing and/or coding and/or sealing elements. By way of example, these may be in the form of connecting stubs, which are designed such that they are or can be connected firmly to the tank, or hooks, eyes, adapters or the like.

The tank-side filter connection is in this case preferably formed in the bottom area of the tank. However, it may also in any case be arranged at least partially or else completely in a corner and/or on a side wall of the tank, depending on the point at which the connection is provided between the water tank and an appliance-side outlet-flow line. For example, it is also feasible to use a tank-side filter connecting element which is passed out of the tank at points at a distance upward from the bottom of the tank, in its installation position for use.

Embodiments such as these make it possible, for example, to provide a tank which is in the form of a jug and/or drawer and in which, in turn, only a filter cartridge which is provided with a corresponding, coded filter-side tank connecting element can be used. The appliance-side connection of the tank connection may be connected as a plug connection to a correspondingly complementary appliance-side tank connecting element, both in this embodiment and in the embodiments described above. The tank-side filter connecting element, which is at a distance from the tank bottom, may, for example, also be in the form of a filter connecting element which can be hooked in on a tank wall, for example in the form of a pipeline which, when a cartridge with an appropriately matching coding is inserted, is used to carry out the untreated water with which the tank has been filled, and which is filtered by the filter cartridge.

If the water inlet openings for the filter path are arranged at an appropriately low level, the essential contents of the tank can also be emptied by means of an embodiment such as this, so that the tank does not contain any unusable water, or only a small amount of unusable water, which cannot be passed through the filter path.

The structures on the filter connection of the tank therefore have to interact on the key/lock principle with corresponding connecting structures on a filter cartridge, in order that the filter cartridge can be inserted into the water tank in such a manner that it can operate. A machine manufacturer or tank manufacturer can in this way ensure that the only filter cartridges which are used are those which ensure reliable operation of the associated machine. By way of example, the reduced pressure for sucking out can be produced by means of a suction pump.

In one particularly advantageous embodiment of the invention, the filter connection of the tank and a connecting stub of the filter cartridge are designed such that they at least partially surround one another. In this case it is possible by way of example, in addition to the coding structures, to ideally also provide sealing structures in various embodiments, such as e.g. radially and/or axially and/or in an interlocking manner.

In principle, coding structures can also be used as operating members in the area of the tank connection. For example, a switching mechanism which is fitted to the tank can thus be operated by the coding structures of the filter cartridge, and this switching mechanism can be used to signal that the filter cartridge is correctly seated or can be used by the associated appliance to recognize the correct type of cartridge. A refinement of the coding elements such as this as an operating member is possible, inter alia, in conjunction with all types of coding structures.

Thus, by way of example, it is also possible to provide double bayonet fittings or multiple bayonet fittings, in which case this double or multiple structure may relate not only in plan view to the circumferential surface of a corresponding connecting element but also to its longitudinal extent. In this case, angle arrangements at different spacings can also be provided, in a plan view of the circumferential surface, between individual, and/or a plurality of, double or multiple bayonet fitting elements. This allows coding to be achieved for differently designed bayonet fitting structures which corresponds to the respectively formed complementary bayonet fitting elements, in which case a bayonet connection can be provided completely in a first, a second or else a further plane in each case, or else it could be made impossible for a bayonet fitting element which is provided on an incorrectly coded filter cartridge to pass through, thus preventing use of this cartridge for operation.

Furthermore, a polygonal shape allows for extensive angle coding for different insertion angular positions of the filter cartridge.

A rotationally symmetrical circumferential contour is preferably provided on the filter connecting element for this purpose. A rotationally symmetrical configuration makes it possible to provide different, predetermined angular positions for insertion of a filter cartridge, with which an additional function can be associated, if required, depending on the angular position.

By way of example, one example for a circumferential shape of the tank-side filter connecting, element according to the exemplary embodiments described above would be provided by a hexagonal cross-sectional contour. By way of example, a contour such as this allows six different angular positions of a filter cartridge corresponding thereto. However, other polygonal shapes are also feasible, for example a triangle, a quadrilateral, a pentagon, a heptagon, an octagon or many more and that is to say in principle all odd-numbered and/or even-numbered polygonal shapes.

The tank-side filter connecting element may in this case be in the form of a recess with a corresponding internal circumference and/or external circumference, or else may be in the form of a projection with a corresponding internal circumference and/or external circumference. A connecting stub can be provided in a corresponding manner with the corresponding circumferential contour either on the internal circumference and/or on the external circumference, both for plugging in and for plugging on a corresponding connecting element of the filter cartridge.

The circumferential surface formed in this way at the same time advantageously forms a sealing surface. This ensures that only a filter cartridge with a seal shape corresponding thereto for the filter output line can be inserted into the tank, and can be connected to the tank-side filter connecting element, such that it can operate. The seal may thus advantageously be produced from the same material as the cartridge housing, preferably by spraying on. The same effect can also be achieved by end coding and/or sealing, for example by a toothed, stepped, corrugated or similar end contact surface which is not flat, between the tank-side and the filter-side connecting element, possibly also in conjunction with further coding structures.

A circumferential surface which is shaped as described above can also be used as a holder for the filter cartridge, which holder corresponds with a correspondingly shaped holding element in the tank area. In this case as well, the circumferential surface provides a coding structure.

Particularly when it forms the sealing surface at the same time, the coding structure, in particular the circumferential surface of the tank-side and/or filter-side connecting element, may have a cross-sectional taper which extends in the axial direction, for example in the form of a truncated cone or pyramid. This allows it to be plugged on in a simpler, sealed manner, without relatively major friction forces.

As has already been mentioned a number of times, the corresponding coding structures, which correspond to the tank-side coding structures, must be provided on the filter cartridge sides. If the sealing surface of the tank-side filter connection is included in the shape of the coding structures, then, in one particular embodiment, the seal itself is provided with the appropriate shape, as the filter-side tank connecting element. For example, if the tank-side filter connecting element has a hexagonal cross section, this makes it possible to provide an appropriately hexagonal seal as the mating piece. In this case, this may be in the form of an axial seal, preferably a radial seal, which is either plugged into a correspondingly shaped hexagonal recess in the above exemplary embodiment, or else is plugged onto a projection that is shaped in the same way.

As stated above, in the case of a tapering cross section, the seal is also preferably appropriately adapted in this case such that it merges over an area when plugged onto a projection which, for example, is in the form of a truncated hexagonal pyramid.

In this refinement, only a filter cartridge with an appropriately shaped seal can be used in such a way that it can operate.

In another embodiment of the invention, the coding structure can also be provided by the shape of the internal and/or external circumference of the tank-side filter connection, such that coding is provided, for example, by a discrepancy from a circular cross-sectional shape of corresponding connecting elements, preferably in conjunction with a correspondingly designed seal which, in particular, may also be provided with a coding structure. It is therefore also possible, for example, by means of an oval shape of the tank-side filter connection to ensure that only a filter cartridge which correspondingly fits this can be used. Furthermore, in conjunction with this and/or with one of the embodiments described above, further coding structures can invariably also be provided, for example projections and/or recesses which act in the axial direction and possibly also have a sealing effect. By way of example, end contours which are in the form of saw teeth, are stepped, are corrugated and/or are structured in other similar ways can be provided axially.

In one development of the invention, two or more different coding structures can also be provided. For example, a fixing means can additionally be provided in conjunction with a coding of the connection as described above, by means of which the filter cartridge can be positioned, and in which case further coding structures can be accommodated in this fixing means. For example, coding over the sealing surface as described above can be combined with an apparatus arranged separately therefrom for fixing and/or additional coding. Such fixing can be provided in the inner area of the filter cartridge and/or alternatively in the outer area of the filter cartridge.

In one particular embodiment, fixing means are provided which project from the bottom of the tank, act on the external circumference of the filter cartridge and may additionally have a coding characteristic. For example, the filter cartridge can be latched or clipped into corresponding latching or clip elements via elements such as these which, if required, may likewise be in the form of a coding structure.

A further coding option for the tank filter connection is to vary the alignment of the longitudinal axis, which runs through the filter-side tank connecting element, with respect to a longitudinal axis which runs through the filter housing such that, for example, these form a specific, in particular acute, angle with respect to one another. For this purpose, the filter-side tank connecting element may be designed such that it is preferably slightly bent with respect to the cartridge housing. Cartridges which do not have a connecting element whose position is aligned bent in this way cannot be used in a correspondingly narrow water tank such that they can operate. A further advantage of coding such as this is that this also makes it possible to fit curved and/or bent water tanks with a comparatively large longitudinal extent in an operationally safe and reliable manner since the bending of the two longitudinal axes with respect to one another makes it possible to provide a correspondingly reliably sealing and fixing tank/filter holder by optimum alignment of the tank-side filter connecting element in the tank and an insertion movement which is not a vertical insertion movement for the angled cartridge.

If required, further guide elements can be provided for this purpose on the filter cartridge, and/or on the tank, for reliable connection of the tank-side filter connecting element to the filter-side tank connecting element. By way of example, ribs which are provided on the tank side and form a tapering cross section in the insertion direction are particularly highly suitable for this purpose, by means of which ribs the filter-side connecting element and/or the filter housing and/or a guide structure which projects from the filter housing, such as a connecting ring or the like, provide guidance during insertion of the filter cartridge. A filter-side guide structure such as this may be in the form of a circumferential surface which can also have contours, in the form of slots in a complementary form to the ribs described above, and/or some other suitable structure.

In the case of rib/slot coding, a further coding option is in turn possible by different angle coding, when seen in a plan view, for one or more such complementary elements. A corresponding filter cartridge can be inserted for operation only when the slot/rib combination and the angled tank/filter connecting structure fit together.

This guide and coding structure described here can, however, also always be used for filter connecting elements which are not angled, but operate in the same way.

An additional guidance and/or coding function can be achieved by recesses or projecting points which are formed at the end on the filter cartridge and can engage in correspondingly complementarily shaped tank-side coding and/or guidance structures.

However, in order to provide a blending apparatus, corresponding openings and/or channels can also be formed in the filter cartridge and, for example with and/or without interaction with a tank-side blending element, allow blending for the water which has been filtered by the filter cartridge. This also applies in a corresponding manner when using a connection which may be joined between the tank-side and filter-side connecting elements, and/or extension element, such as an adapter with the same and/or a different connecting structure and/or coding structure and/or fixing structure and/or sealing structure.

In order to ensure that the coding according to the invention cannot be circumvented by replacing the tank in a machine with a tank which is not permitted and has no coding structures, for use of filter cartridges which are not permitted, it is recommended that the interface between the tank and the machine likewise be provided with coding structures which may be the same as one of the exemplary embodiments described above. In this case, the machine-side and the tank-side connecting elements must be appropriately coded.

The invention also covers embodiments which provide the connection of the filter cartridge via separate adapter parts which can be connected to the filter cartridge or to the tank. This also applies to the connection between the tank and the associated appliance.

The invention can be used advantageously with all appliances which use water, in particular with domestic appliances which use water or appliances for preparation of foodstuffs and/or drinks, such as automatic drinks machines, in particular automatic coffee machines, drinking water dispensers, cooking and baking appliances, steam and/or high-pressure cleaners, air cleaners and air conditioners or the like, which have a corresponding water tank.

As already described above, the present invention also covers a line-connected water filter connecting element in the form of a water filter connecting head, which is distinguished in that its connecting element which is intended to hold a water filter has an internal and/or an external circumferential surface with a polygonal contour. All the features which have been described above with respect to a connection between a water filter cartridge and a water tank also apply in the same sense and in a corresponding manner to the connection of a water filter cartridge to a line-connected water filter connecting head such as this.

BRIEF DESCRIPTION OF THE SEVERAL VIEWS OF THE DRAWING(S)

Figure 2:
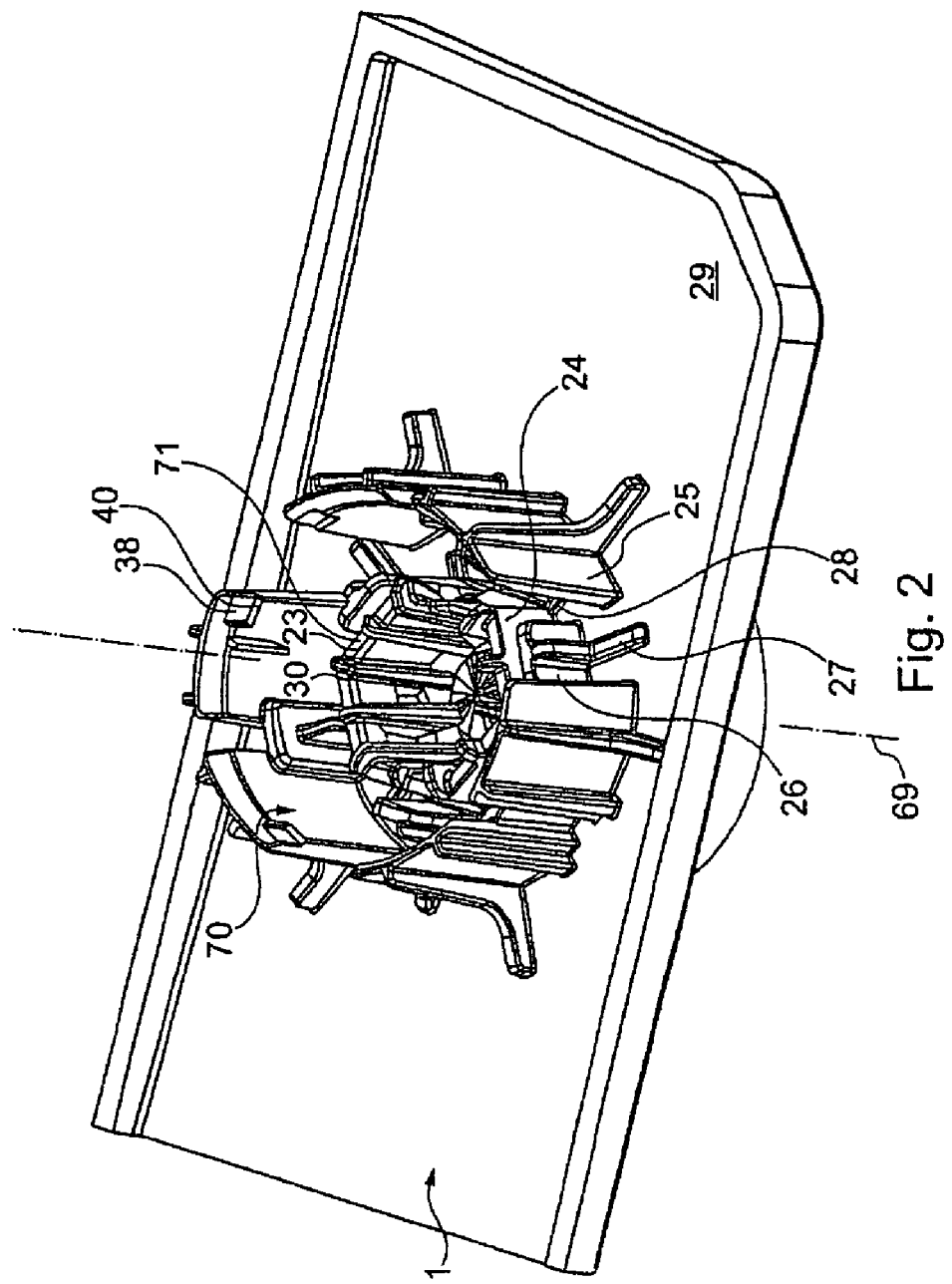
Figure 3:
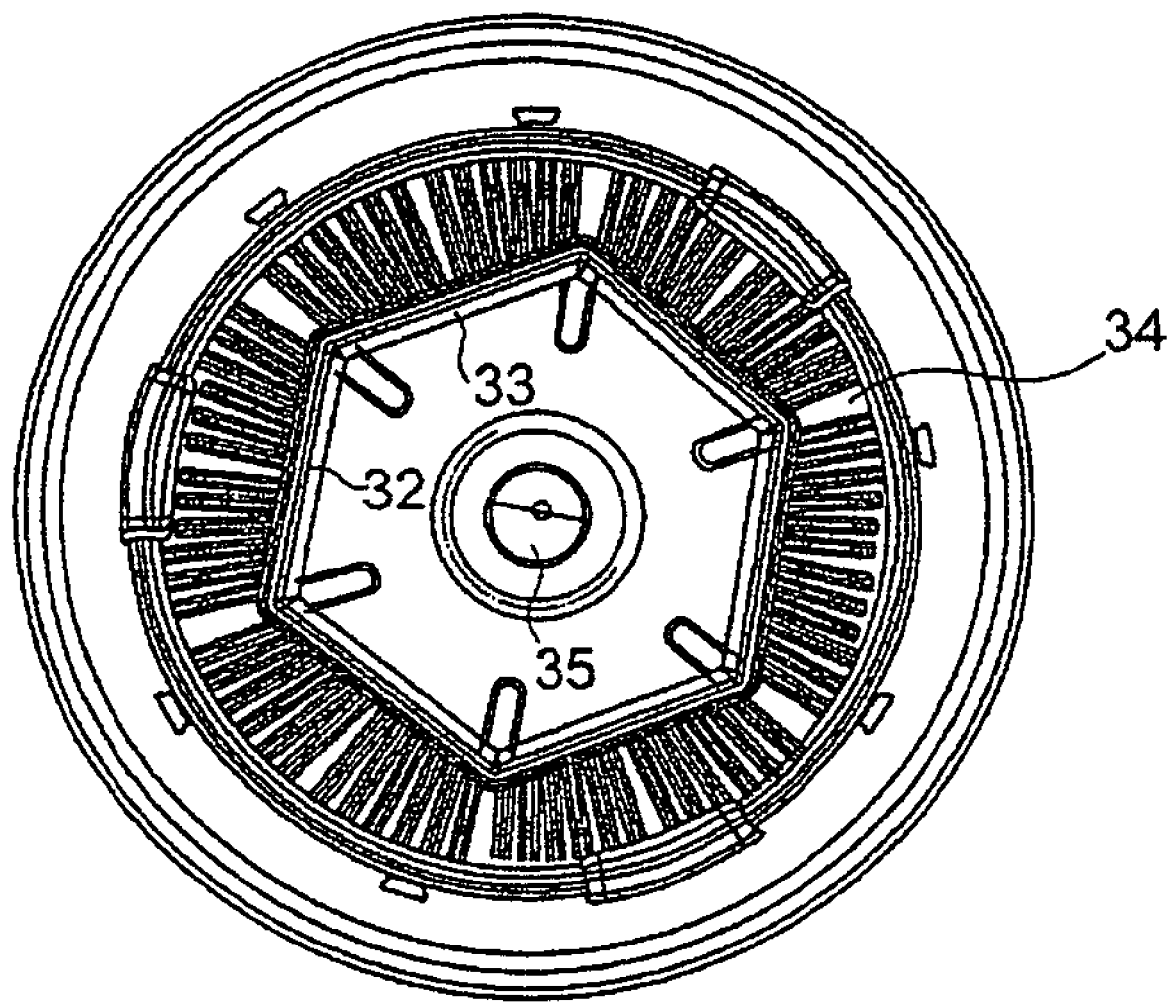
Figure 4:
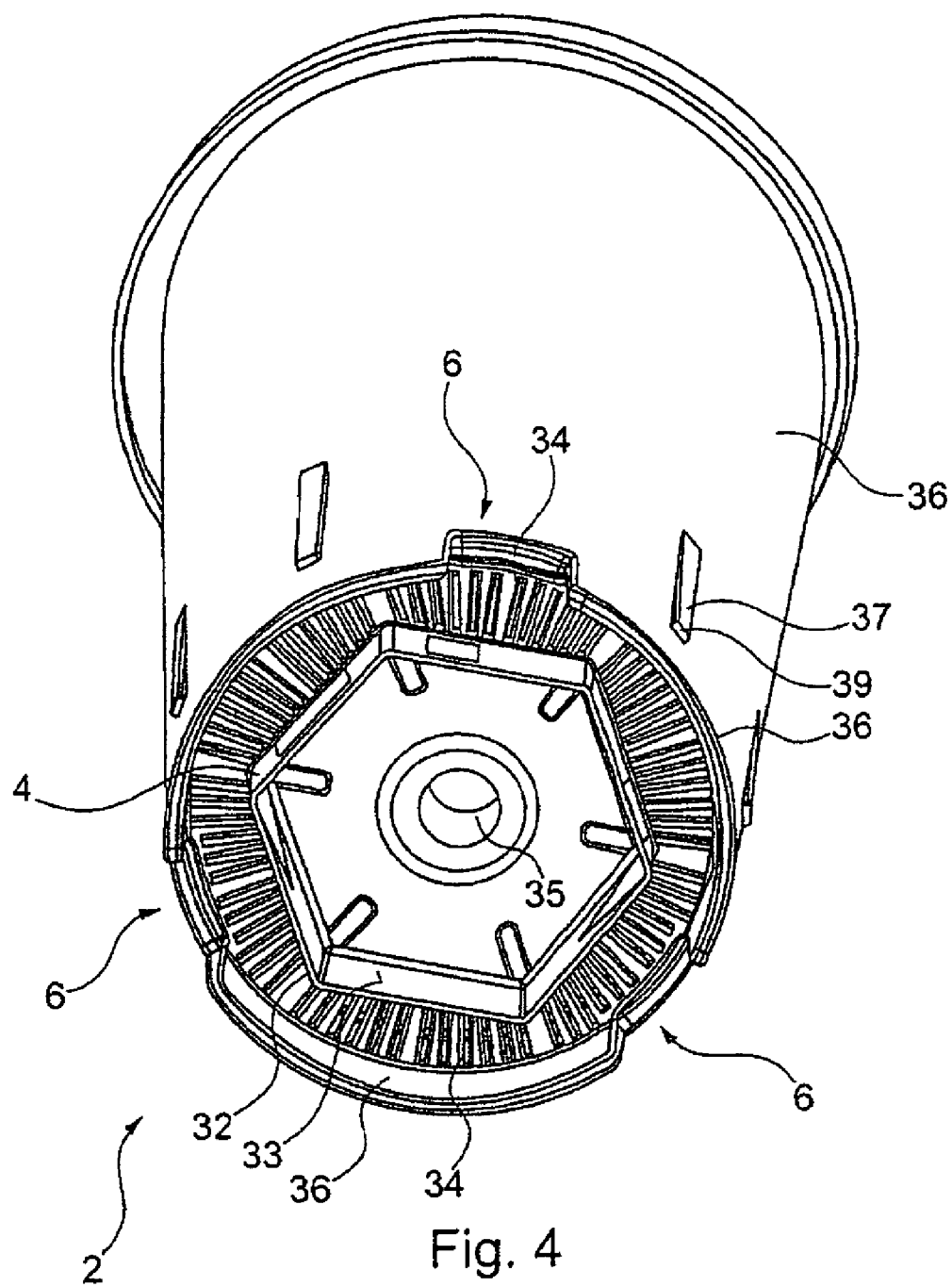
Figure 5:
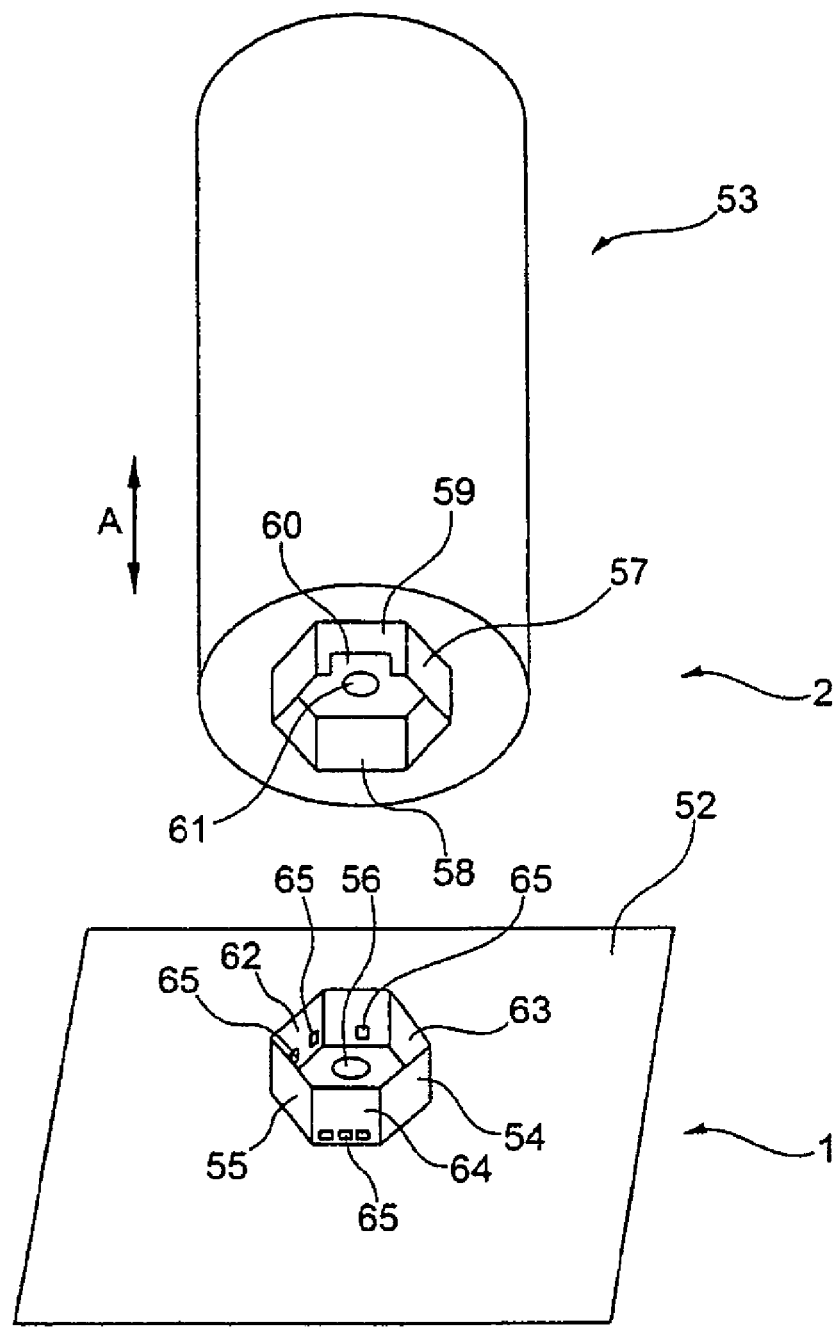
Figure 5A:
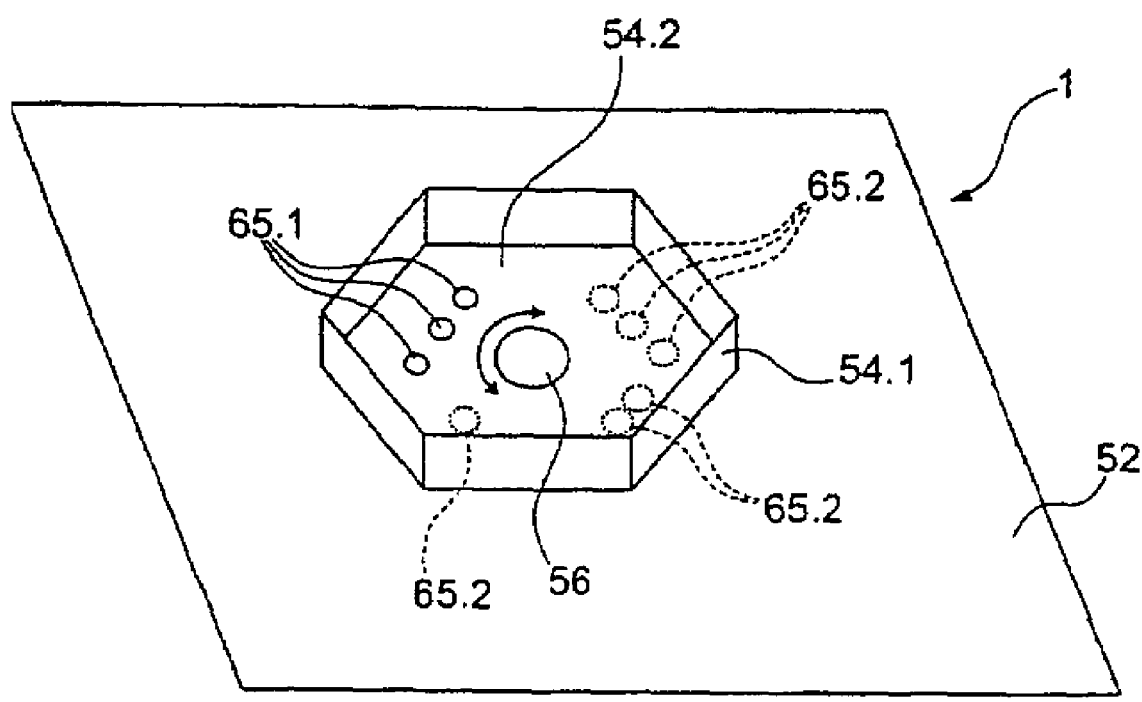
Figure 16:
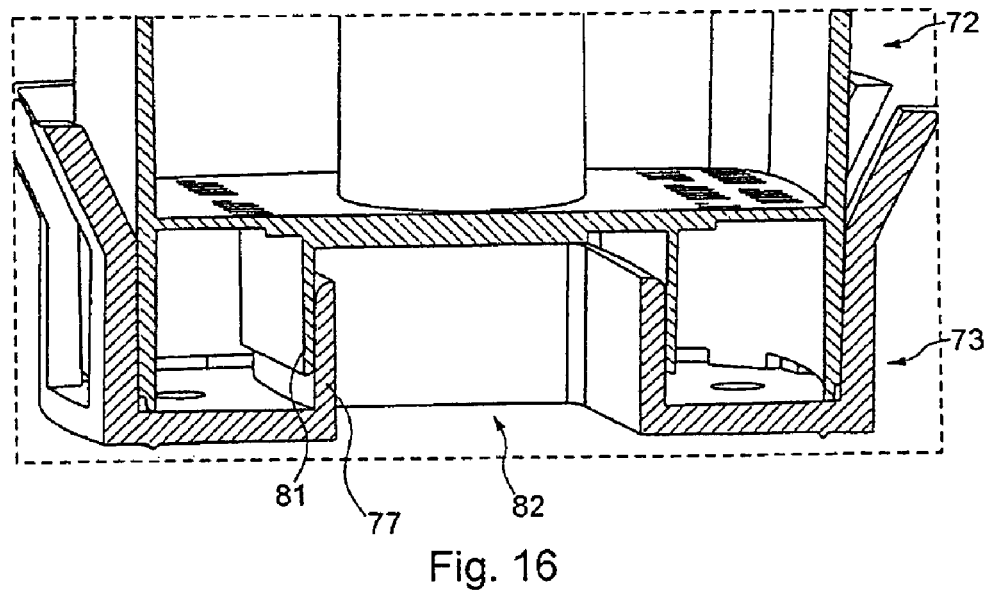
Figure 17:
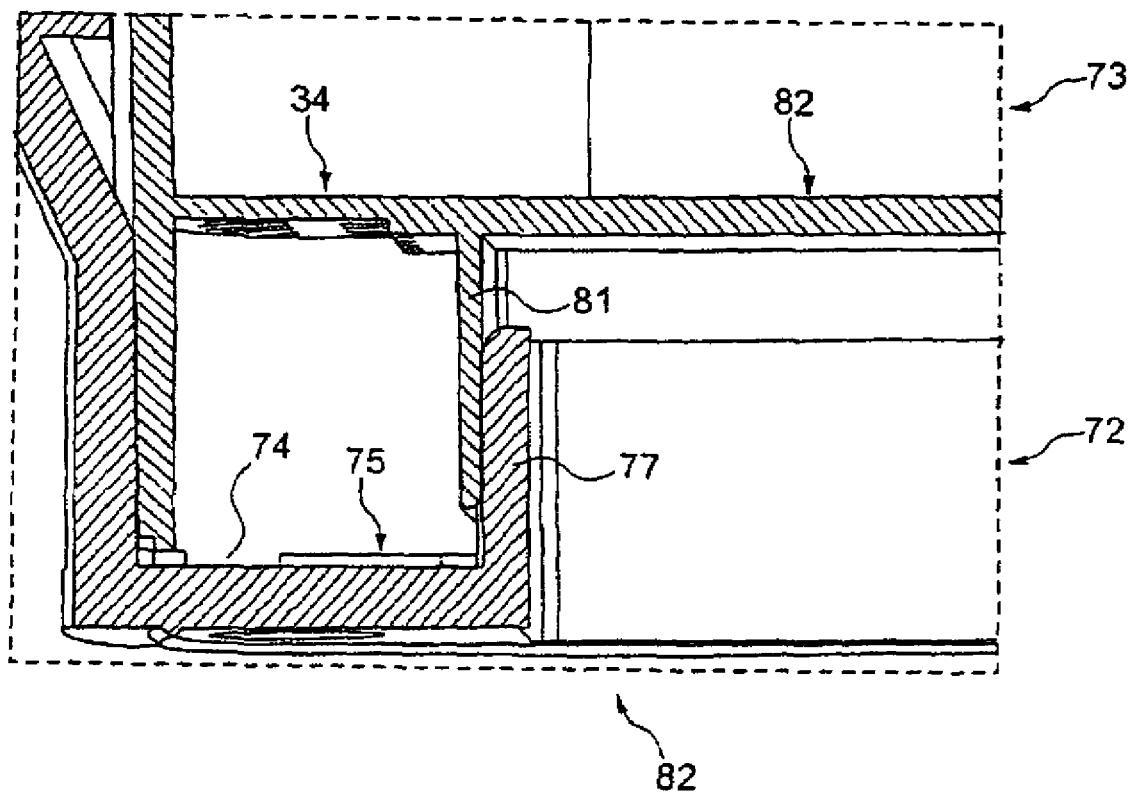
Figure 18:
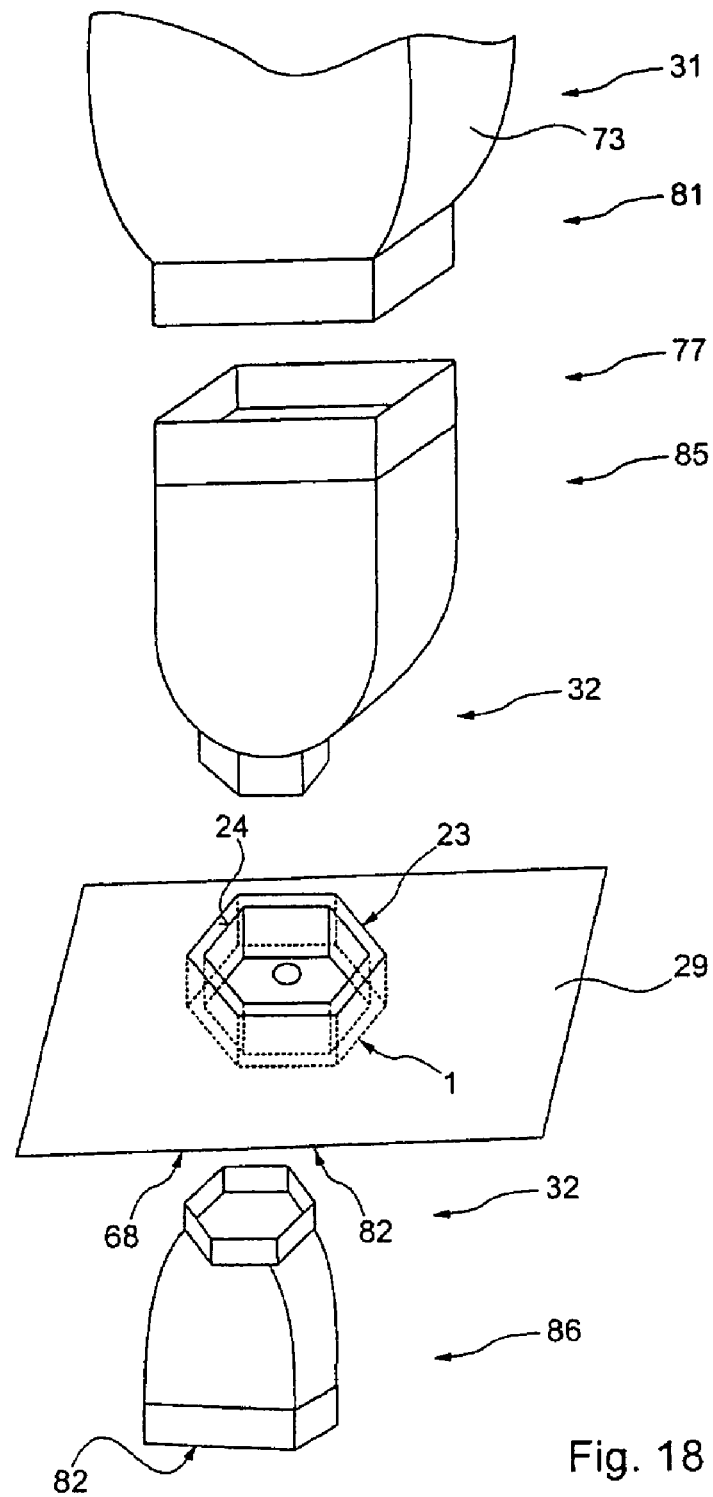
Figure 19:
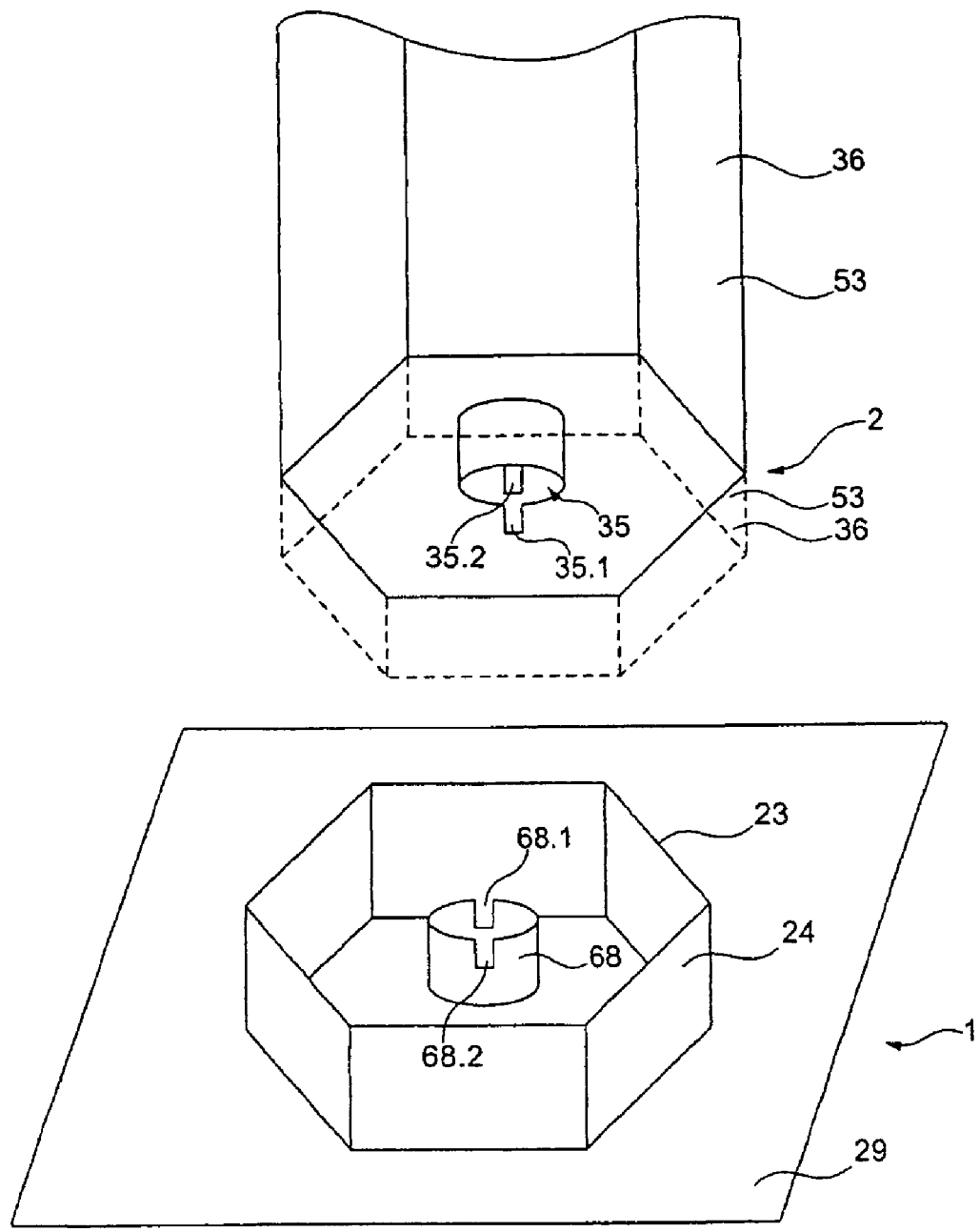
Figure 20:
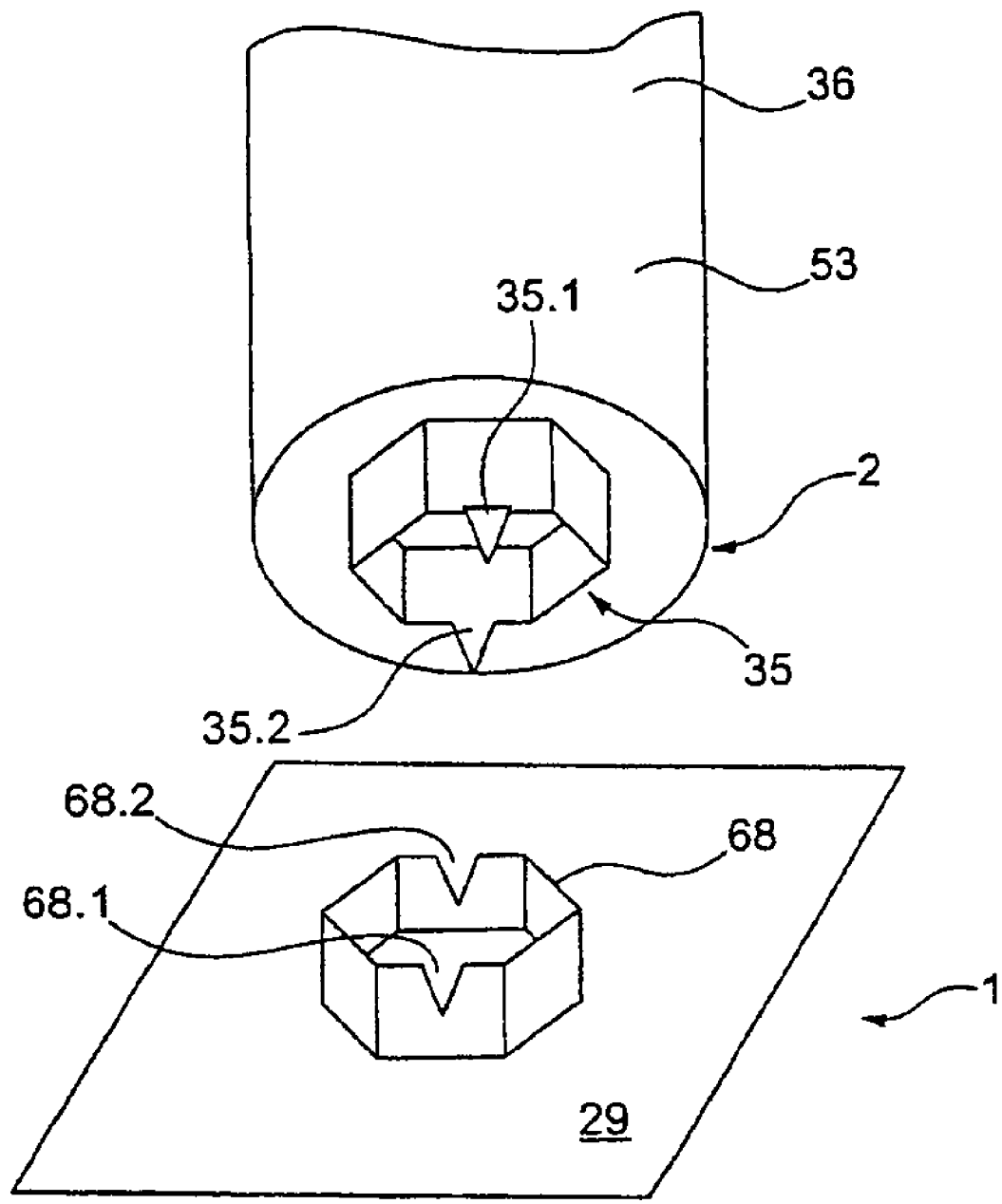
Figure 38:
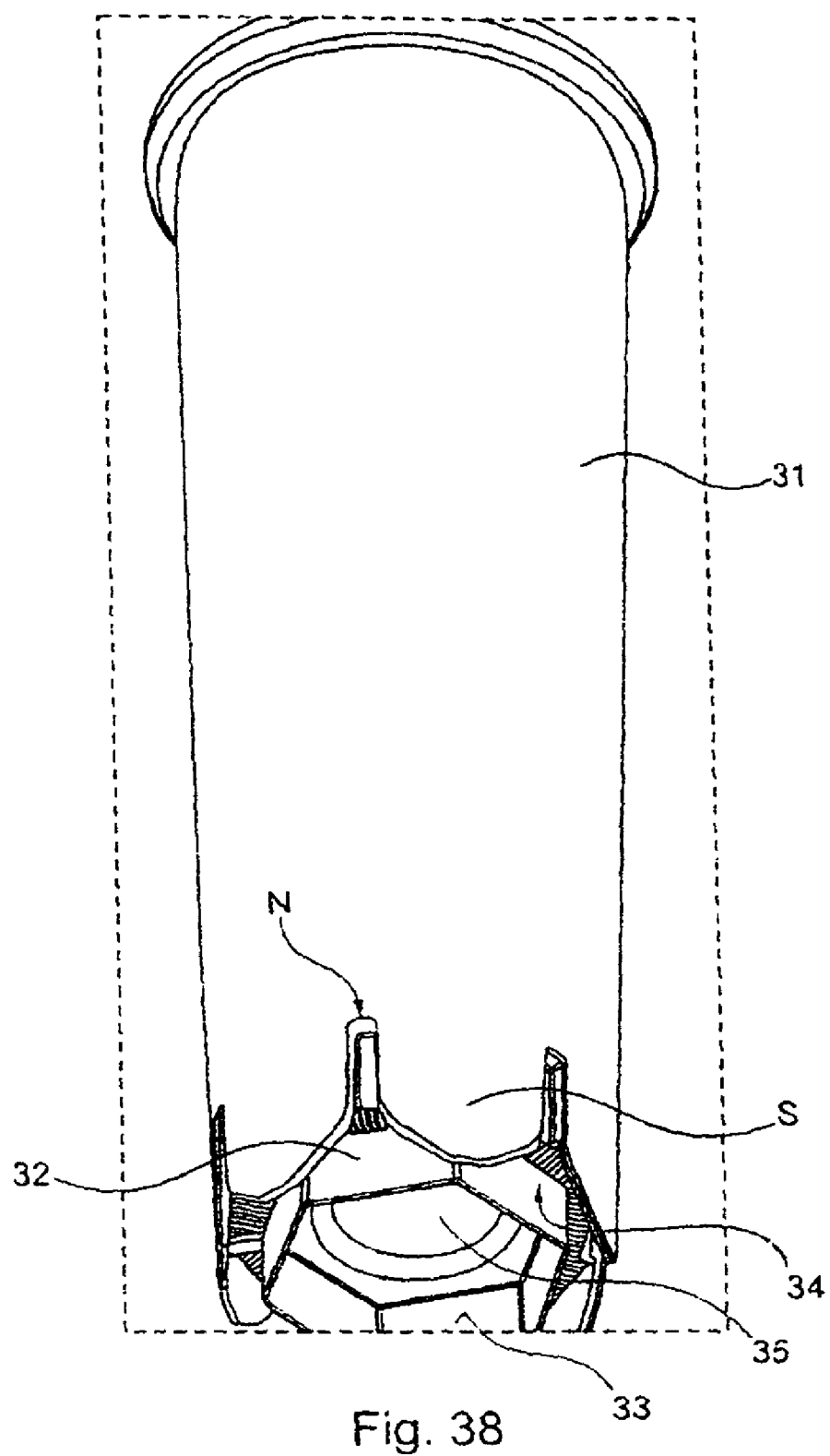

Various exemplary embodiments of the invention are illustrated in the drawings, and will be explained in more detail in the following text with reference to the figures in which, in detail:

FIG. 1 shows a side view of a bottom detail of a water tank with a filter cartridge inserted, FIG. 2 shows a plan view of a bottom detail of a water tank as shown in FIG. 1, FIG. 3 shows a plan view of the tank connecting element of a filter cartridge as shown in FIG. 1, FIG. 4 shows a perspective illustration of a filter cartridge as shown in FIG. 1, FIGS. 5 and 5*a* show two embodiment variants with angle-dependent blending amount setting, FIGS. 6 to 17 show further embodiments of a filter connection for a filter cartridge which can be connected to a tank, having a tank-side filter connecting element and a filter-side tank connecting element, schematically and by way of example in different views and details, FIG. 18 shows, by way of example and schematically, a filter-side and an appliance-side tank connection, in each case in conjunction with a correspondingly designed adapter piece, FIGS. 19 and 20 show two further embodiments of coding for a tank/filter connection, and FIGS. 21-57 show further possible embodiments, in the form of various views, by way of example and schematically.

DETAILED DESCRIPTION OF THE INVENTION INCLUDING BEST MODE

FIG. 1 shows connecting elements 1, 2 of a tank 66, which is illustrated schematically in the form of a detail by dashed lines, and of an associated filter cartridge 31. On the tank side, a connecting fitting 1 is illustrated, which is firmly connected, for example welded, adhesively bonded or attached in some other way, to the bottom 29 of the associated tank 66. The tank connecting element 2 of the filter cartridge 31 is inserted into this connecting fitting 1. The filter-side tank connecting element 2 can be seen better in FIG. 4 and comprises a connecting stub 4 which merges into the cartridge housing 36. In the embodiment variant shown in FIGS. 1 and 4, the water is passed via side slots 6 and then via aperture openings 34, which are arranged at the bottom of the cartridge, into the interior of the cartridge housing 36, and then passes through a filter bed, which is not illustrated in any more detail. The filter path may in this case be in the form of an upward flow, a downward flow, or a combination with both flow guidance processes. The filtered water is in the end passed through the central outlet-flow tube 35, via the tank-side appliance connection 68, into the suction connection 67 of the water tank 66.

The tank-side appliance connection 68 is illustrated here, just by way of example, as a connecting stub with a round shape, for simplicity reasons. Like the connecting fitting 1 of the tank-side filter connection, however, the tank-side appliance connection 68 may also have coding structures in order to ensure that only permissible connections can be made, that is to say both to a filter cartridge to be used for the tank and, if desired, to an appliance which is suitable for use of this tank. For the sake of clarity, details such as this for the appliance connection 68 are not illustrated graphically and, with regard to the embodiments that are possible to do this, reference is made to the embodiments described with respect to the tank/filter connection, which are also fully applicable to the tank/appliance connection.

A first embodiment of tank-side filter cartridge coding is shown as a tank-side filter connecting element in FIGS. 2 and 5, whose circumferential sealing surface 33 has a polygonal cross section. In this specific exemplary embodiment, the polygon is in the form of a hexagon, being representative of a multiplicity of other possible embodiments. In one exemplary embodiment, which is still to be described in the following text, a tank-side filter connecting element is illustrated as a modification of this, whose circumferential surface represents a polygonal cross section in the form of a quadrilateral.

Further details relating to possible coding between a tank-side filter connecting element 1 and a filter-side tank connecting element 2 will be described in the following text with reference to FIG. 2. The tank-side filter connecting element 23 which in this case by way of example is in the form of a hexagon, and is in the form of a connecting fitting 23, is designed, in order to provide its polygonal contour as a projection 23, with a polygonal external circumference 24 and a correspondingly polygonal internal circumference. After the filter cartridge has been plugged on, the internal circumference 33 of the complementary cartridge connecting structure is preferably located in an interlocking and sealing manner on the external circumference 24 in a first possible form of attachment, thus fixing and sealing the filter cartridge 31.

In this case, the tank-side filter connecting fitting 23 and the connecting stub 4 of the filter cartridge can in a preferred manner at least partially surround one another. If surrounded completely, in addition to the additionally stabilizing effect on the circumferential contact surfaces between these two elements, this also ensures good, large-area sealing between the fresh-water side in the interior of the tank 66 and that side of the filter apparatus which is located at the connecting opening 35, for appliance supply via the suction connection 67.

In a complementary embodiment corresponding to FIG. 18, and as a reversal on this configuration, the tank-side filter connecting element 23 may be in the form of a complementary structure in the form of a recess with a corresponding internal circumference on which, once again, the sealing surface 33 of the filter cartridge can rest, preferably in an interlocking manner and forming a seal over a large area, with this once again at the same time ensuring that the filter cartridge 31 is adequately fixed on the tank 66.

Further details relating to the coding of the tank/filter connection for the embodiment in the form of a projection 23 will now be described once again with reference to FIG. 2. However, these statements also apply in the same sense to a filter connection in the form of the recess 23, as described above, corresponding to FIG. 18. Because of this relationship, the same reference symbols are therefore also used for the respective identical features in the same sense for both embodiments.

The tank-side connecting fitting 23 (FIG. 2) has a hexagonal external contour whose circumferential outer surface forms a sealing surface 24. Outer shells 25 which point in the direction of a filter cartridge 31 to be inserted and are aligned approximately parallel to a longitudinal axis 69 which runs through the connection are arranged externally around the fitting 23 and are suitable for at least partially surrounding a filter cartridge housing, or its connecting area, on the outside.

Blocking elements 26 are fitted in the intermediate space 70 between the connecting fitting 23 and the outer shells 25, and ensure that only a narrow seal, which fits onto the sealing surface 24, can be inserted into the area of the connecting fitting 23.

Bottom ribs 27, 28 prevent sealing with respect to the tank bottom 29, in the same way that inner ribs 30 prevent sealing by means of an inner radial seal. The bottom ribs are preferably arranged close to the bottom, aligned radially and/or tangentially with respect to the connecting stub 23. The inner ribs 30 project inwards and/or upwards beyond an upper rim 71 of the connecting fitting 23. These structures result in only the sealing surface 24 being accessible as a sealing surface, thus resulting in a coding structure according to the invention by virtue of the hexagonal external contour, that is illustrated here by way of example, of the sealing surface 24.

The filter cartridge 31 that is used is provided with a molded seal 32, which correspondingly likewise has a hexagonal cross section (see FIG. 3). The inner surface of the molded seal 32 in this case forms the sealing surface 33.

Furthermore, FIG. 3 shows the inlet slots 34 for supplying water into the filter cartridge, as well as a central outlet-flow opening 35 out of which water flows.

Via the molded seal 32 with correspondingly shaped connecting fitting 23, the illustrated embodiment also comprises further coding structures. Snap-action elements 37 (cf. FIG. 4), for example, are integrally formed externally on the filter cartridge housing 36. The snap-action elements 37 can be inserted into corresponding receptacles 38 of the outer shells 25. A pressure point results when the lower edge 39 is fitted to the stop 40 of the receptacles 38. The filter cartridge 31 can easily be fitted as far as this position, without any opposing resistance, in the correct angular position. In this angular position, the molded seal 32 is located such that it is aligned with respect to the sealing surface 24 of the connecting fitting 23, such that it can be inserted further in the axial direction. By being pushed further in in the axial direction, the snap-action element 37 snaps over the stop 40, with the molded seal 32 being pushed in along the sealing surface 24. The filter cartridge 31 is fixed in the outer shells 25 by the incline on the snap-action elements 37 and the corresponding internal shape of the outer shells 25. There is no longer any need for any further axial fixing elements in this embodiment.

FIG. 5 shows a schematically illustrated embodiment with a blending amount which can be adjusted as a function of the angle. Only a detail of the tank bottom 52 is illustrated, in the connecting area of the filter cartridge 53. The tank bottom 52 comprises a hexagonal connecting fitting 54 which converges slightly in the upward direction in order to improve the sealing effect in comparison to a purely vertical alignment of the fitting walls, and/or as a further coding structure in the form of a truncated pyramid. This cross-sectional taper can scarcely be seen in the perspective illustration.

The outer surfaces 55 of the connecting fitting are at the same time also used as a sealing surface in order to seal the outlet-flow line 56 entirely or partially with respect to the interior of the tank, when the filter cartridge 53 is fitted.

The filter cartridge 53 has a hexagonal seal 57, which is coded correspondingly to the connecting fitting 54. The individual walls 58 have an equal length in the axial direction A, with the exception of one wall 59. The wall 59 is provided with a cutout 60 on the underneath, the function of which will be explained in more detail in the following text. The outlet 61 from the filter cartridge 53, through which the filtered water enters the outlet-flow line 56, can be seen in the interior of the seal 57.

Different fitting walls 62, 63, 64 of the connecting fitting 54 are provided with a different number of bypass openings 65. The bypass openings 65 are arranged such that they are closed to form a seal by the relatively long sealing walls 58, when the filter cartridge 53 is plugged on. The bypass openings 65 can remain open only where the wall 59 with the cutout 60 is used, so that filtered water passes directly via the cutout 60 from the tank to the area of the outlet-flow line 56.

As can be seen without any difficulty from the illustrated exemplary embodiment, the size of the free cross section of the bypass openings 65 is adjusted by the angle arrangement of the filter cartridge, that is to say by the choice of the fitting wall 62, 63, 64 on which the cutout 60 is incorporated.

In the present embodiment, the cross-sectional openings of the plurality of incorporated bypass openings 65 are added. In other embodiments, bypass openings 65 of different sizes can also simply be provided. Different proportions of unfiltered water, to which filtered water is added, result from the different cross sections of individual bypass openings 65 or from the sum of a plurality of bypass openings 65 on one fitting wall, for example the fitting wall 64. This therefore results in a blending setting which is dependent on the angular position of the filter cartridge 53.

A further possible embodiment of a blending setting can be provided, for example, by the formation of a driver element, which can be operated by the filter cartridge, in the form of a connecting fitting 54.1, whose position can be adjusted by rotation, corresponding to the illustration in FIG. 5a. The bottom 54.2 of the connecting fitting 54.1 which can rotate in this case has, by way of example, three bypass openings 65.1 and, depending on the rotation position with respect to the tank bottom 52, can be arranged such that complementary bypass openings 65.2 which are arranged in the tank bottom 52 can be opened in order to conduct fluid, or can be closed.

Purely by way of example, this illustration shows four different settings, the illustrated rotation position with the bypass closed and three further positioning options with respectively one, two or all three bypass holes 65.1 being opened by their positions corresponding to the corresponding bypass holes 65.2.

One possible separation variant between the bypass holes 65.1, which are connected to the tank-side fresh-water connection, and the outlet-flow line 56, which is arranged centrally by way of example, would be the arrangement of a seal located in between, in particular and preferably an axial seal, which extends between the end face of the filter-side tank connecting element and the bottom 54.2 of the connecting fitting 54.1, to form a seal. However, it is also invariably possible to use different and possibly also additional separating and/or sealing elements between the fresh-water side and the filtered-water side.

In addition to the illustrated embodiments, further embodiments and/or combinations with this embodiment are also feasible, without any problems. For example, the previously described coding structures, in the form of hexagonal polygons which are illustrated by way of example, may be added to and/or combined with other coding structures, once again by way of example in the form of quadrilateral polygons for instance, as is additionally shown by way of example by one embodiment in FIG. 6.

In addition to the illustrated embodiments, further embodiments or combinations of these embodiments are feasible, without any problems. For example, the previously described coding structures, in the form of hexagonal polygons which are illustrated by way of example may be added to and/or combined with other coding structures, once again by way of example in the form of quadrilateral polygons for instance, as is additionally shown by way of example by one embodiment in FIGS. 6 to 17.

Figure 6:
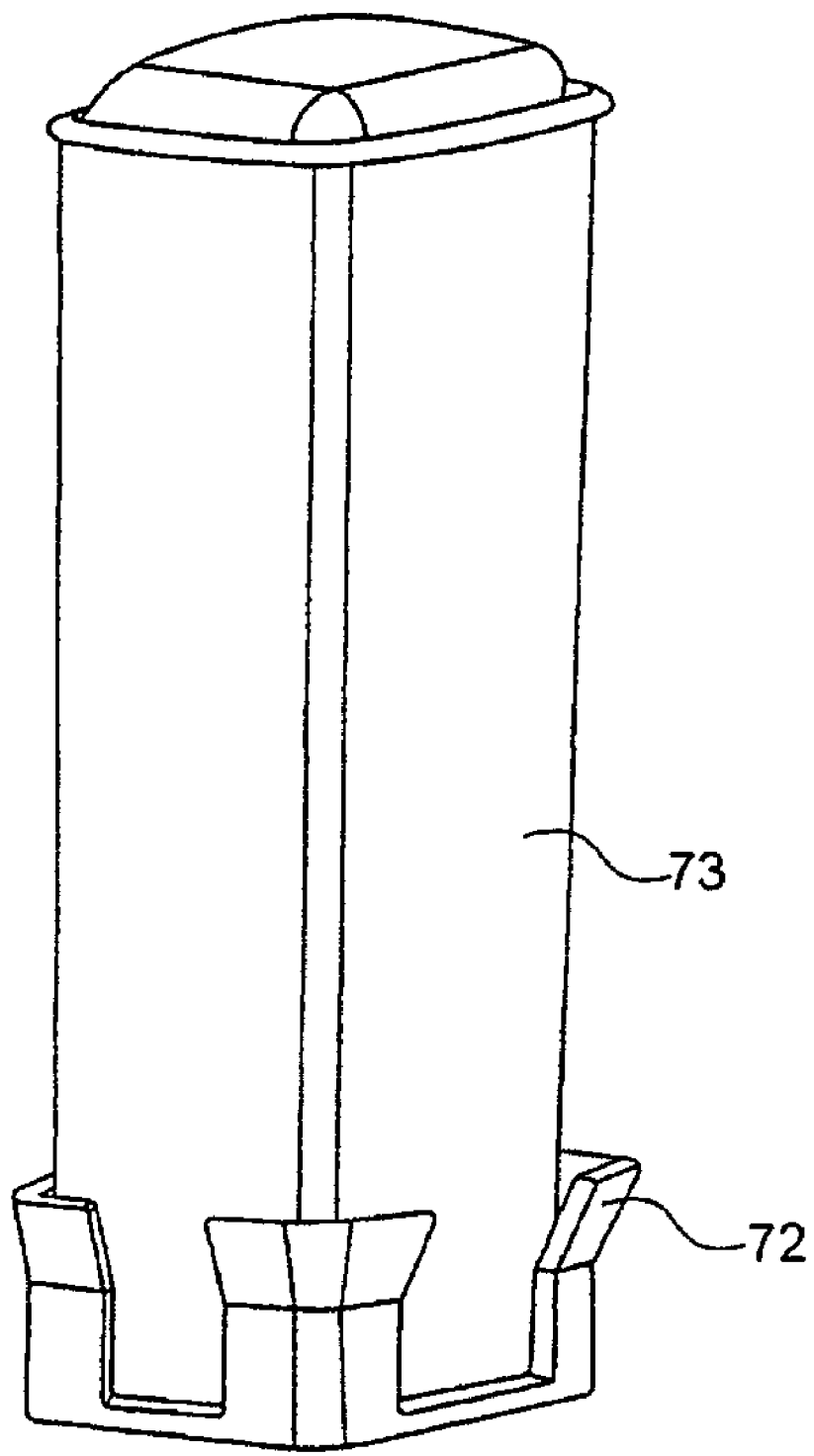

In detail, FIG. 6 shows a connecting fitting 72 which, in a plan view, has a quadrilateral contour and in which a correspondingly shaped cartridge 73 is inserted, with a complementary connecting piece, which likewise has a quadrilateral cross section. For the sake of clarity, the tank and the tank bottom, to which the connecting fitting 41 can be connected to form a seal, have not been illustrated here.

Figure 7:
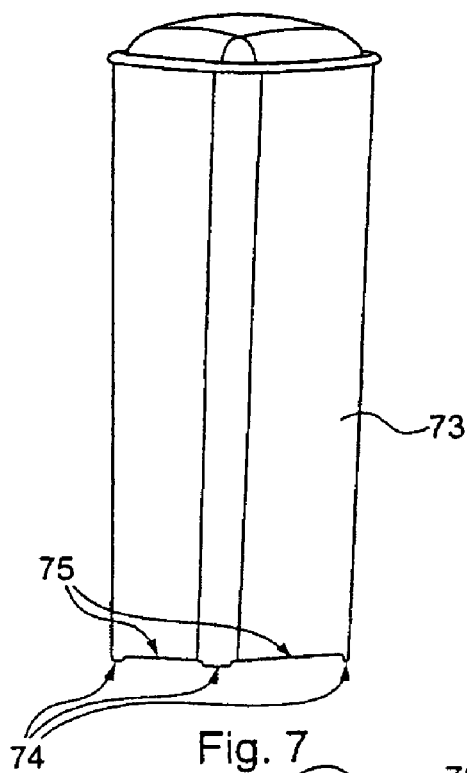
Figure 8:
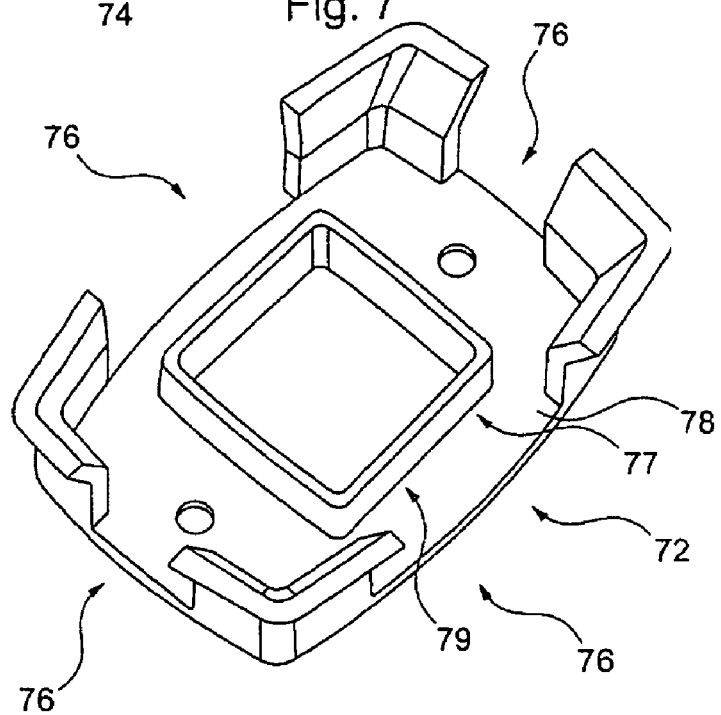

FIGS. 7 and 8 show the cartridge 73 and the connecting element 72, in each case illustrated on their own. Three of four feet 74 which are provided can be seen in the lower area of the cartridge 73, between each of which feet 74 an inlet opening 75, which is sufficiently large for fresh water to enter, is formed when a cartridge 73 is plugged into the connecting element 72. The connecting element 72 has correspondingly complementary inlet openings for the fresh water to pass through from the tank toward the filter cartridge 73. A connecting fitting 77 which, for example, corresponds to the connecting fitting 23 is formed centrally on a baseplate 78 of the connecting element 72, once again in the form of a projection. This connecting fitting 77, which is in the form of a projection, has on its external circumferential surface a sealing surface 79 which, with respect to a complementary holding structure which is arranged on the filter cartridge, separates the fresh-water area from the area of the water filtered by the filter, forming a seal. The connecting fitting 77 can preferably also be provided in this quadrilateral embodiment with an at least slightly conical shape, so that the connecting piece of the cartridge to be fitted can on the one hand be fitted more easily while, on the other hand, a larger mutually covering surface area can be provided for sealing between the two elements.

Figures 9, 10:
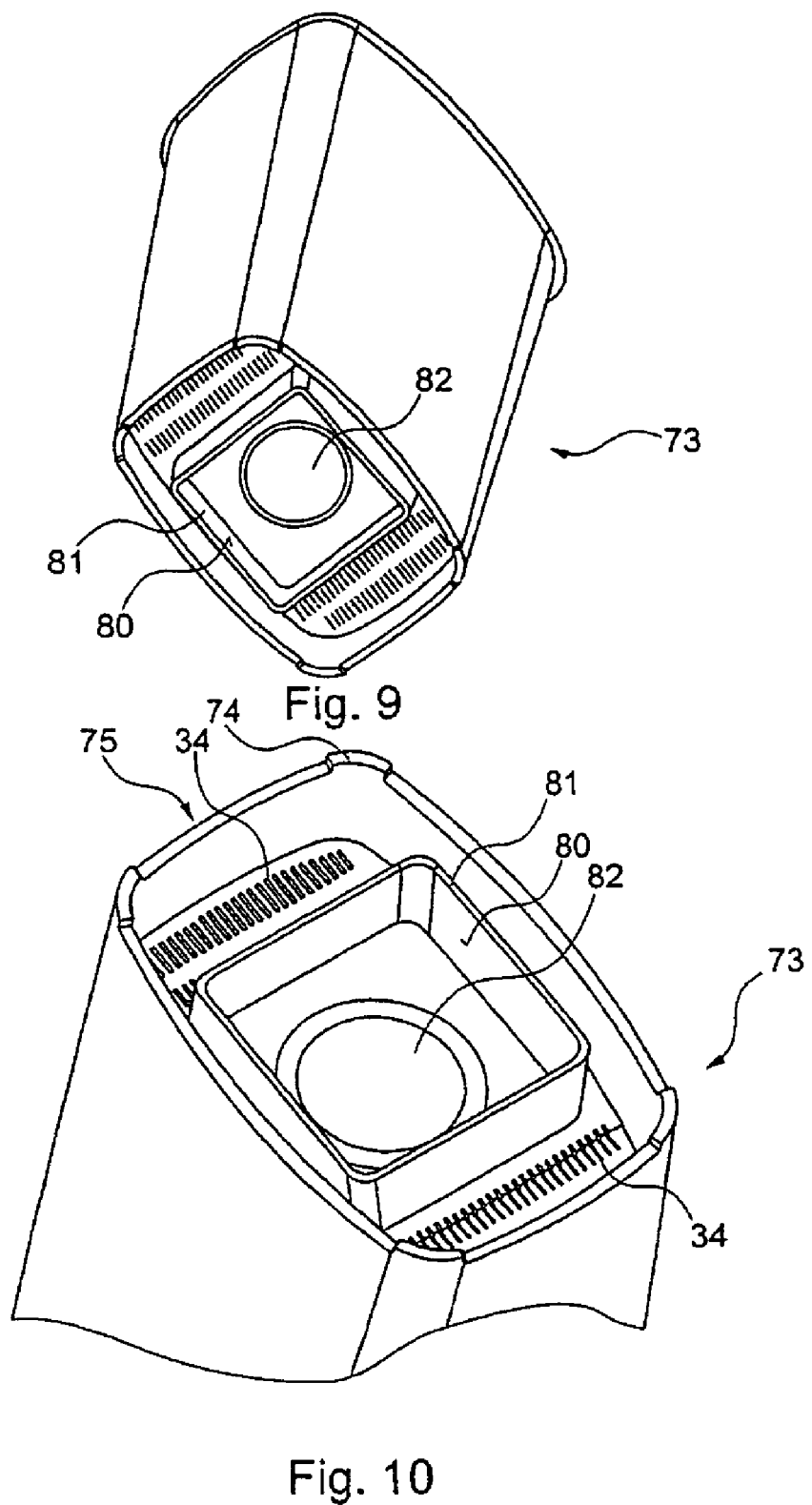

FIGS. 9 and 10 each show a cartridge 73, viewed from underneath, in which a molded seal 81, which is complementary to the connecting fitting 77, with a sealing surface 80 formed therein is illustrated. The outlet 82 for the filtered water can be seen centrally in the middle, and this filtered water can flow in the filter through the inlet slots 34.

Figure 11:
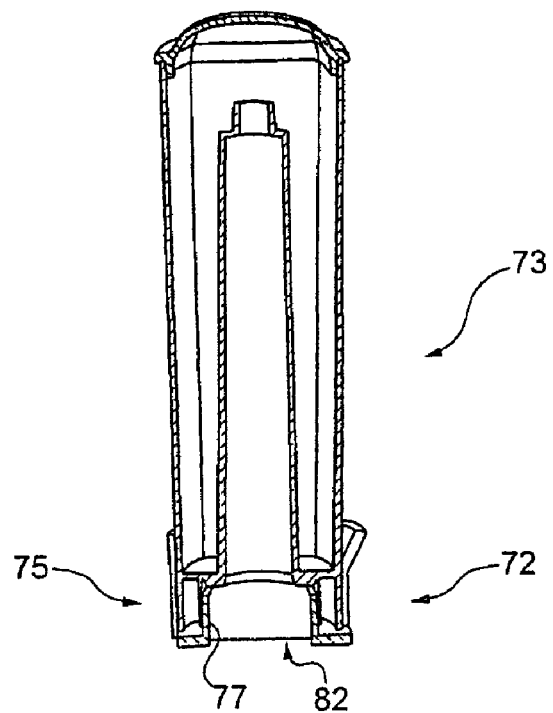
Figure 12:
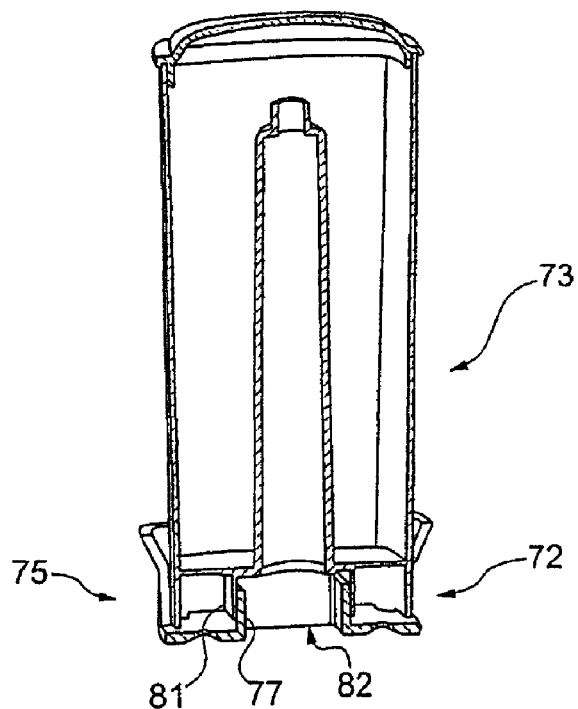

FIGS. 11 and 12 each show a longitudinal section through the connecting element 72 and a cartridge 73 inserted into it, on the one hand along the width face (FIG. 11) and on the other hand along the longitudinal face (FIG. 12) of the connecting structure with a rectangular plan view.

Figure 13:
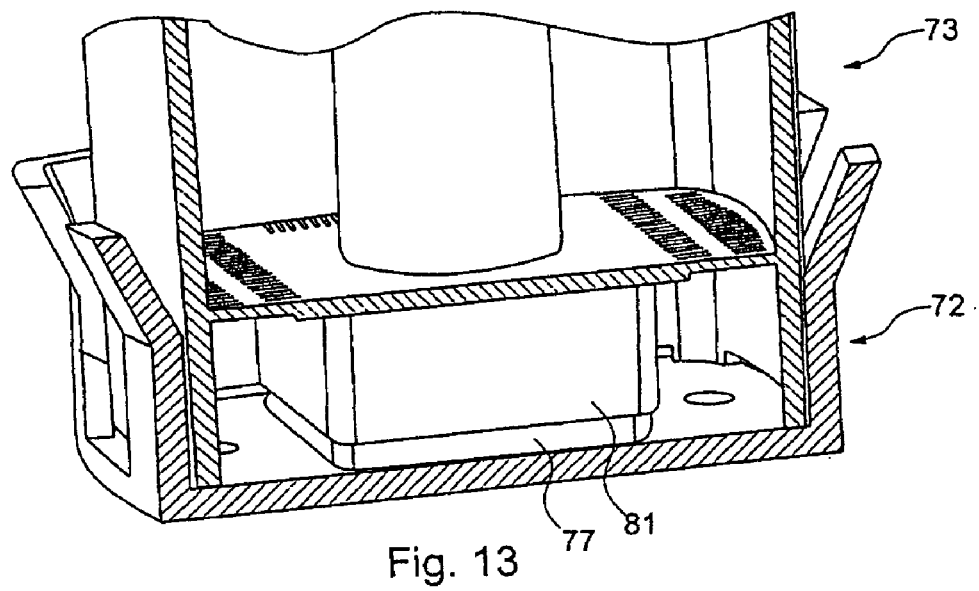
Figure 14:
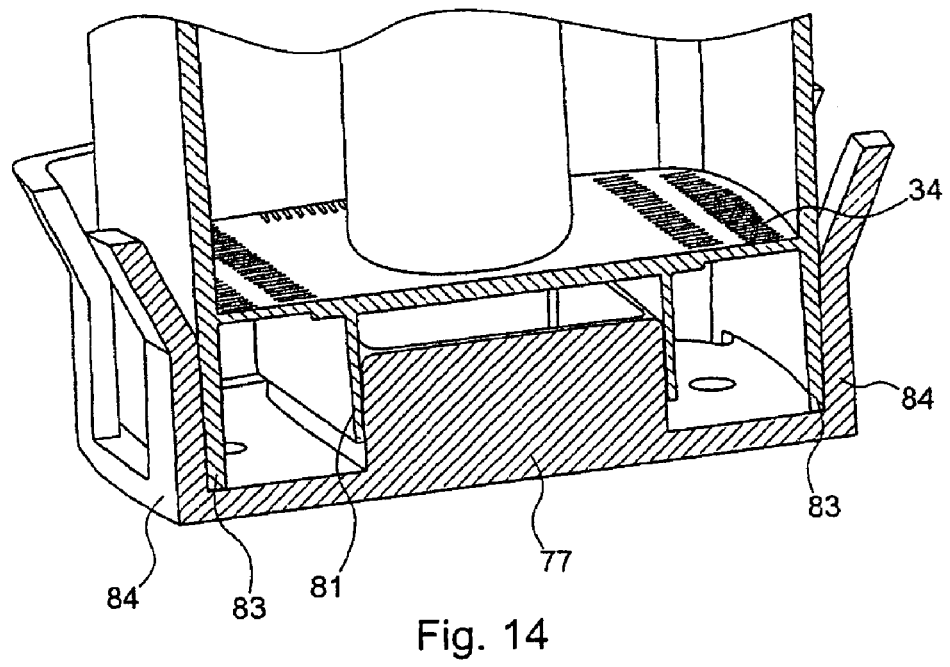

FIGS. 13 and 14 show two details in the connecting area between the connecting fitting 77 and the cartridge 73 with the molded seal 81 arranged therein, in each case on a section plane located at a different depth. FIG. 14 shows particularly well that, in addition to the interlocking connection between the molded seal sealing surface 80 (FIG. 10) and the connecting fitting 77, a fixing effect is also provided between the lengthened outer wall 83, the filter cartridge 73 and the elements of the outer shell 84, preferably likewise in an interlocking manner.

Figure 15:
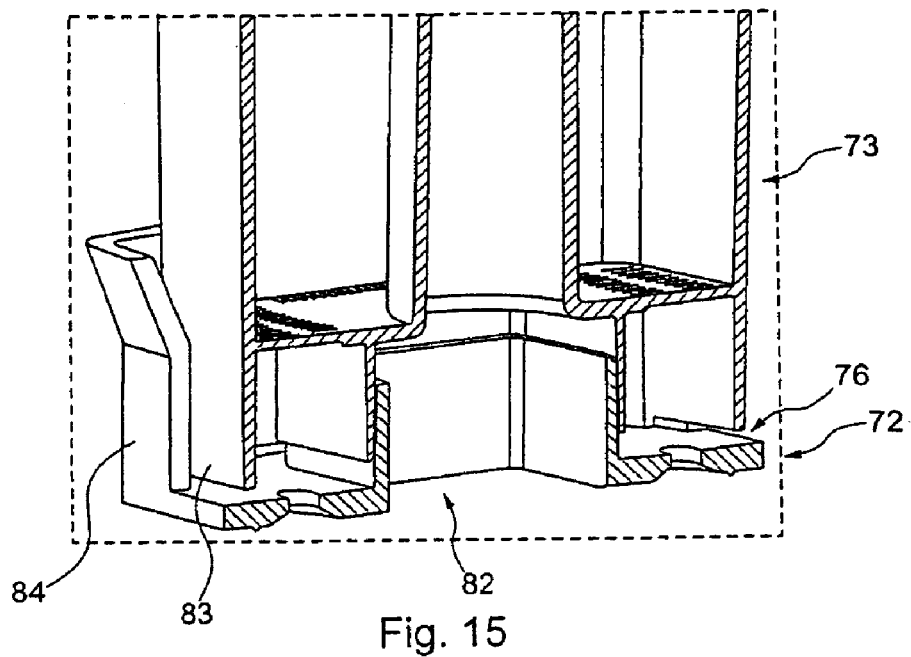

FIGS. 15 and 16 show two further sectional illustrations, corresponding to FIGS. 13 and 14, but once again on section planes which are located at different depths.

Finally, FIG. 17 shows a further illustration, in the form of a detail, on an even larger scale.

Finally, in addition to a fitting/filter connection, described in comparison to the embodiments in FIGS. 1 to 4 and in the form of a projection 23 on the tank-side filter connecting element 23, FIG. 18 shows a complementary shape as a recess 23 which is formed in the tank bottom 29 and in which, in the same sense, all of the coding options described with respect to the first embodiment can also be implemented here, to be precise either in the same way and/or also in a complementary form, or else in combined embodiments.

As a second major feature, FIG. 18 shows the possibility of using adapters 85, 86. The adapter 85 is illustrated purely by way of example for connection of a filter cartridge 73, which is likewise illustrated in the form of an example, to a tank-side filter connection 1, in which case the embodiment of the filter connection 1, in particular of its fitting 23, as already described above, can be provided both in the form of a projecting fitting and in the form of a recessed groove. This also applies in the same sense to the tank-side appliance connection on the underneath of the tank bottom 29. As a result of the same functionalities in this sense, the individual elements are also provided with the same numbers as those which in some cases have already been used in the description above.

The illustrated embodiment variants show widely different coding structures which can be provided according to the invention. In each case, this ensures that only appropriately matched filter cartridges with a key function will fit into the corresponding tank-side filter connections.

Two possible further embodiments of codings for the connection between the tank and the filter are illustrated in FIGS. 19 and 20, and will be described with reference to these figures. In FIG. 19, the housing of the filter cartridge 53 itself has a polygonal external contour in the form of a hexagon, which can be inserted into a complementary, tank-side polygonal coding and/or fixing structure 23. The bold solid lines show the filter cartridge 53 in a view obliquely from underneath with a bottom, which is flat at the base, in whose center the filter outlet 35 for the filtered water is provided, for example, as a cylindrically projecting tube with two end axially projecting attachments 35.1 and 35.2. This cylindrically projecting outlet element 35 is coded and formed by the two axially projecting vanes and, together with its end face and with respect to the end face of a complementary outlet and holding element 68, which is formed in the tank-side filter connection, forms, together with its two coding grooves 68.1 and 68.2, an axial coding and/or sealing structure or contour. The filter cartridge 53 can be inserted into the tank side filter connecting element 1 in such a manner that it can operate only if the end face of the filter outlet 35 fits the end face of the tank-side appliance outlet 68, forming a seal.

In the embodiment illustrated by the solid lines, the hexagonal external contour of the filter cartridge 53 which is illustrated by way of example here can be inserted into the connecting fitting 23 of the tank-side filter connecting element 1, fixing it and if required also forming a seal. In this case, the internal circumference of the connecting fitting 23 is used for fixing and, if required, for sealing with respect to the external circumference and with respect to its connection.

In order to show a further attachment option between the polygonal external contour, which is illustrated by way of example here as a hexagon, of the filter cartridge 53 and a correspondingly complementary tank-side connecting fitting 1, the housing 36 of the filter cartridge 53 is shown by the dashed lines as being lengthened with respect to the previously described filter bottom. This polygonal connecting ring, which projects with respect to the bottom of the filter cartridge, can, in order to fix the filter cartridge, be placed over or likewise plugged in over the tank-side filter connecting stub 23, once again fixing it and preferably forming a seal, depending on the embodiment, until the two internal codings of the filter outlet 35 and of the tank outlet 68 rest on one another, forming a seal, or their vane-like and complementary slot-like coding structures, which are shown here by way of example, rest on one another or engage in one another, forming a seal. Appropriate openings and/or channels are provided in order to pass water from the tank into the interior of the filter cartridge, although these are not shown here. Corresponding bypass structures can likewise be provided, but are not shown, as have already been described in detail above. FIG. 19 therefore shows the filter cartridge being fixed both on the internal circumference of the tank-side filter connecting element 23 and on its external circumference 24.

In contrast, FIG. 20 shows an embodiment which is modified such that the housing 36 of the filter cartridge is, for example, illustrated as being round, and the filter output 35 is illustrated as a polygonal structure, in this case once again by way of example as a hexagon, which additionally and once again has end coding in the form of two axially projecting, coding, triangular points or vanes. In this case as well, the filter cartridge can be connected to the tank-side filter connecting element 1 in such a manner that it can operate only if the two outlet structures 35 and 68 can be joined to one another at their ends axially, forming a seal. Further coding and/or fixing structures have not been illustrated, for clarity reasons. However, all the structures which have already been described above can also be provided in a corresponding manner here. It can also be said for the two embodiments corresponding to FIGS. 19 and 20 that these coding structures can also be interchanged between the filter side and the tank side and/or can be modified and/or can have further contours and/or structures added to them.

FIGS. 21 to 32 show further possible embodiments of coding and/or fixing structures for tank/filter connecting elements. In this case, FIGS. 21 to 24 show a first possible embodiment, FIGS. 25 to 28 show a second, and FIGS. 29 to 32 show a third possible embodiment of bayonet connections, in particular double or multiple bayonet connections.

The major aspect in the case of the embodiments in FIGS. 21 to 32 is in this case to show different possible codings in the form of double and multiple bayonet connections and key codings in the form of key/lock functions. FIGS. 21 and 22 show the filter-side tank connecting coding and fixing structure with eight projections 21.1 and 21.2, in the plan view corresponding to FIG. 28, which, corresponding to FIG. 21, are provided along the longitudinal extent of the filter-side tank connecting element, both axially and in mutually offset radial angular positions, as two pairs of four.

The complementary connecting and coding structures 20 are shown in the tank-side filter connecting element 19 in FIGS. 23 and 24. In this embodiment, corresponding to FIG. 24, an angle α is illustrated between one axis of an x-y coordinate system that is shown and an axis which runs through the opening 20, as a comparatively acute angle α. In order to allow the filter-side tank connecting element 8 to be fixed to the tank-side filter connecting element 19, those coding projections 21.1 which are arranged furthest forward at the end must be arranged distributed in a manner corresponding to the circumferential distribution of the openings 20 on the tank-side filter connecting element 19 in such a manner as to allow any axial insertion of the filter-side tank connecting element at all. After overcoming the first insertion depth relating to the coding projections 21.1, a rotary movement must be carried out about a longitudinal axis which runs through the filter-side tank connecting element until the second set of coding projections 21.2 matches the openings 20, thus allowing further axial insertion of the filter-side tank element into the tank-side filter element, until it is fixed, following a further rotary movement about the longitudinal axis, by means of the filter-side tank connecting element.

FIGS. 25 to 32 illustrate similar embodiments, but with contours, which have been modified in comparison to the embodiments 21 to 24, of the openings 20 and of the coding projections 21 that are complementary thereto and with respect to alignments with modified angles, when viewed axially and in a plan view.

A further difference is also the number of coding structures in each case. In the embodiments 21 to 24, there are a total of eight on two levels, and in the embodiments 25 to 32 there are in each case only six, as two triple-coded projection levels. These coding structures described here can also be combined without any problems with other, for example axially aligned, coding structures in order to allow even further distinguishing options for individual tank/filter connections.

Figure 39:
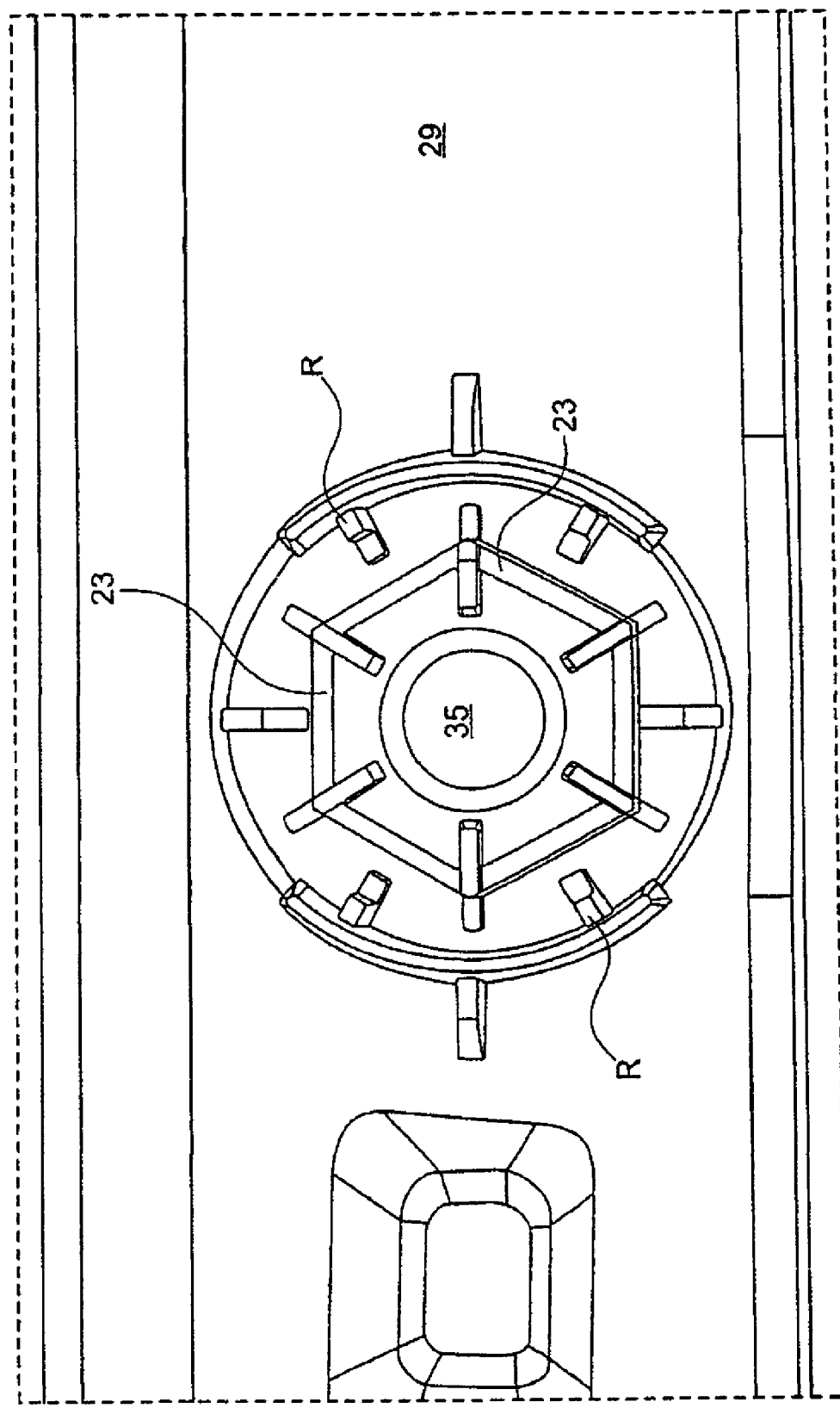
Figure 40:
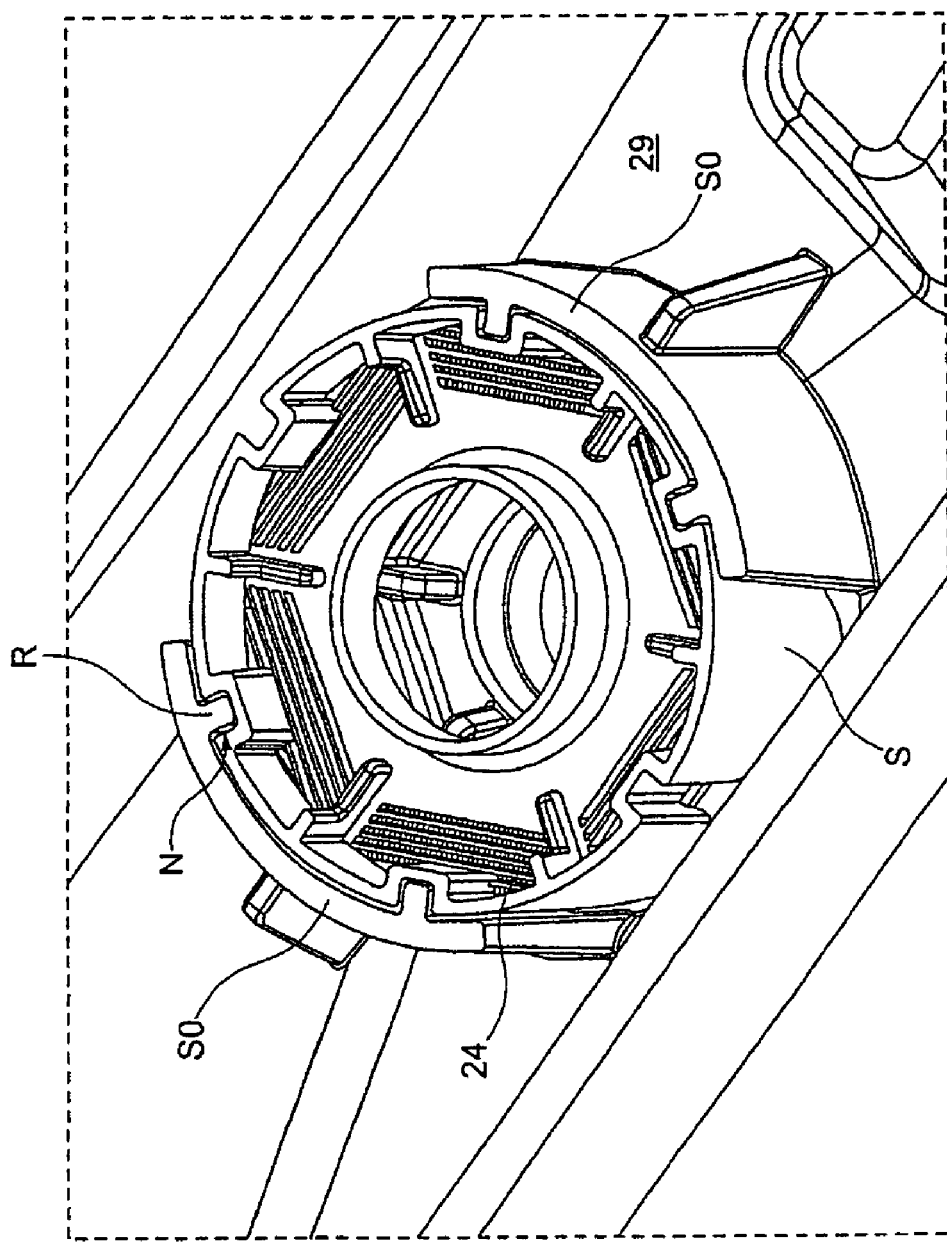

FIGS. 33 to 40 show a further embodiment of a tank/filter connection, in various views and illustrations such as oblique plan views, section illustrations, a front view and a view from underneath of the filter cartridge 31, as well as a plan view of the tank-side filter connecting element with and without a filter-side tank connecting element inserted (FIGS. 39 and 40).

The major features of the embodiment of a tank/filter connection are the approximately wedge-shaped points S which project at the end from the filter cartridge 31, and the grooves N arranged between them. The geometric dimensions and angular positions of these points S and grooves N with respect to one another once again allow different codings and fixing points for the filter-side connecting element on the tank-side filter connecting element.

The points can also be used for positioning during insertion of the filter cartridge into the tank connecting stub, in particular for connections which cannot be seen visually, for example in order to avoid damage to the sealing structures and/or other structures.

In this case, the slot separations and/or the slot widths and/or widths of the points or projecting vanes, likewise as well as their lengths and/or separations, which must correspond to corresponding structures on the tank-side filter connecting element, are particularly suitable for coding in order to allow the insertion of a filter cartridge whose use is permitted.

These corresponding coding and/or fixing structures comprise ribs R (FIG. 39), which are formed on the tank-side filter connecting element and whose interaction with the coding and/or fixing structures N and S that are formed on the filter-side tank connecting element can best be seen in FIG. 40. In this case, the ribs R are formed on a fitting SO which partially surrounds the filter-side tank connecting element and is in the form of a wall.

The coding and/or fixing structure described above may also be in a complementary form, in an embodiment which is modified from this, that is to say with grooves instead of ribs, and ribs instead of grooves. In a further modified embodiment, however, a mixed or combined coding and/or fixing structure is also invariably possible, by forming grooves and ribs on one tank-side or filter-side connecting element, and/or on the other.

Figure 41:
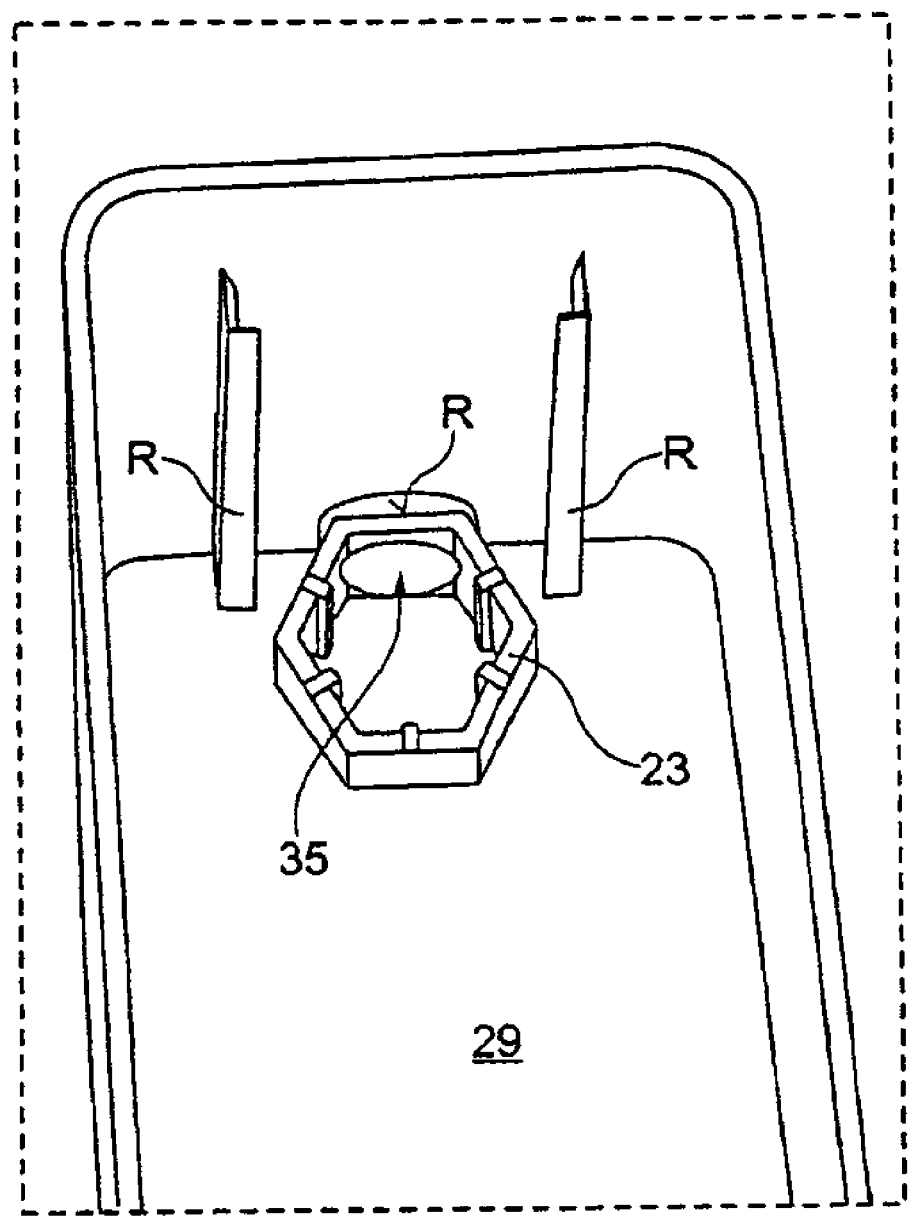
Figure 42:
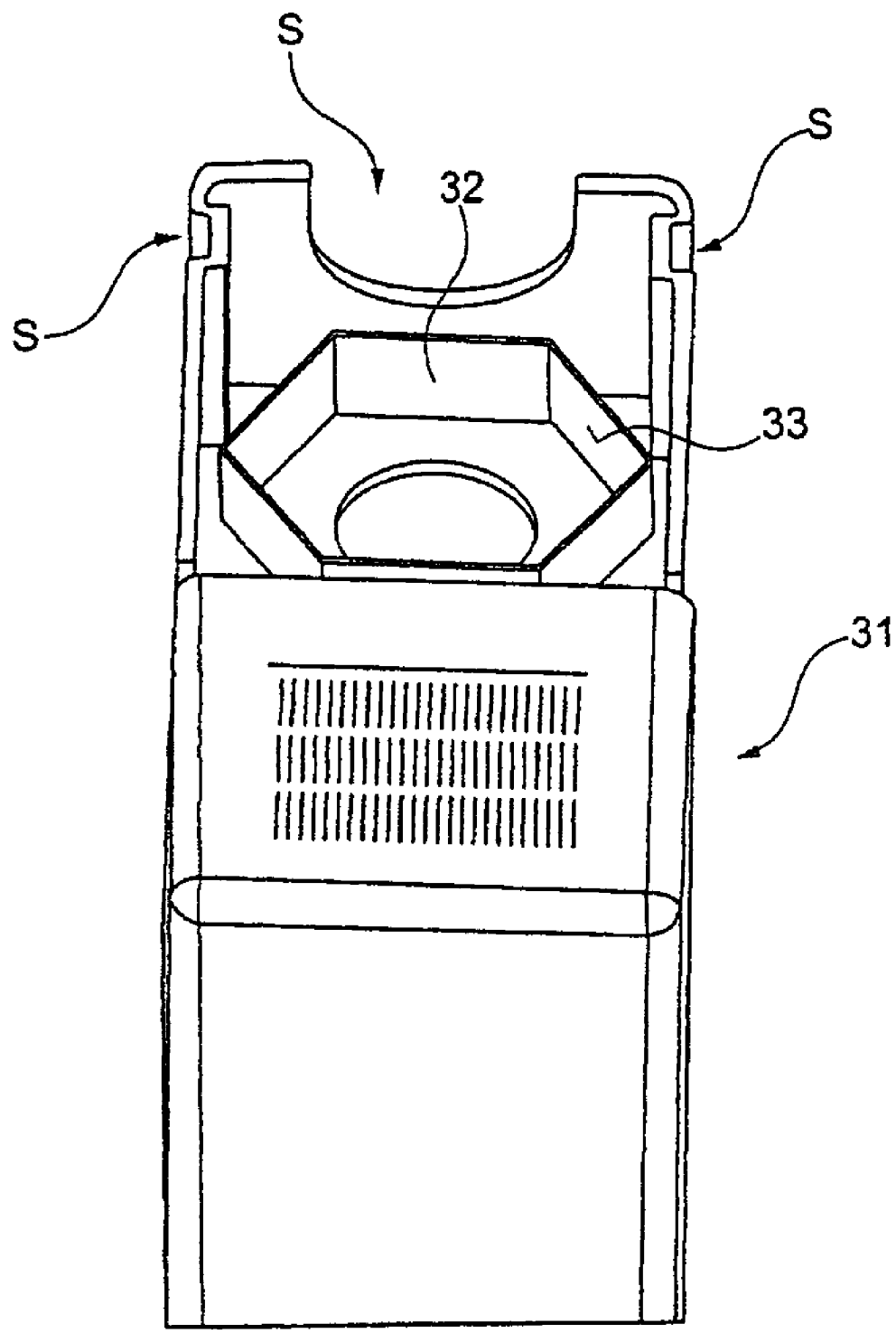
Figure 43:
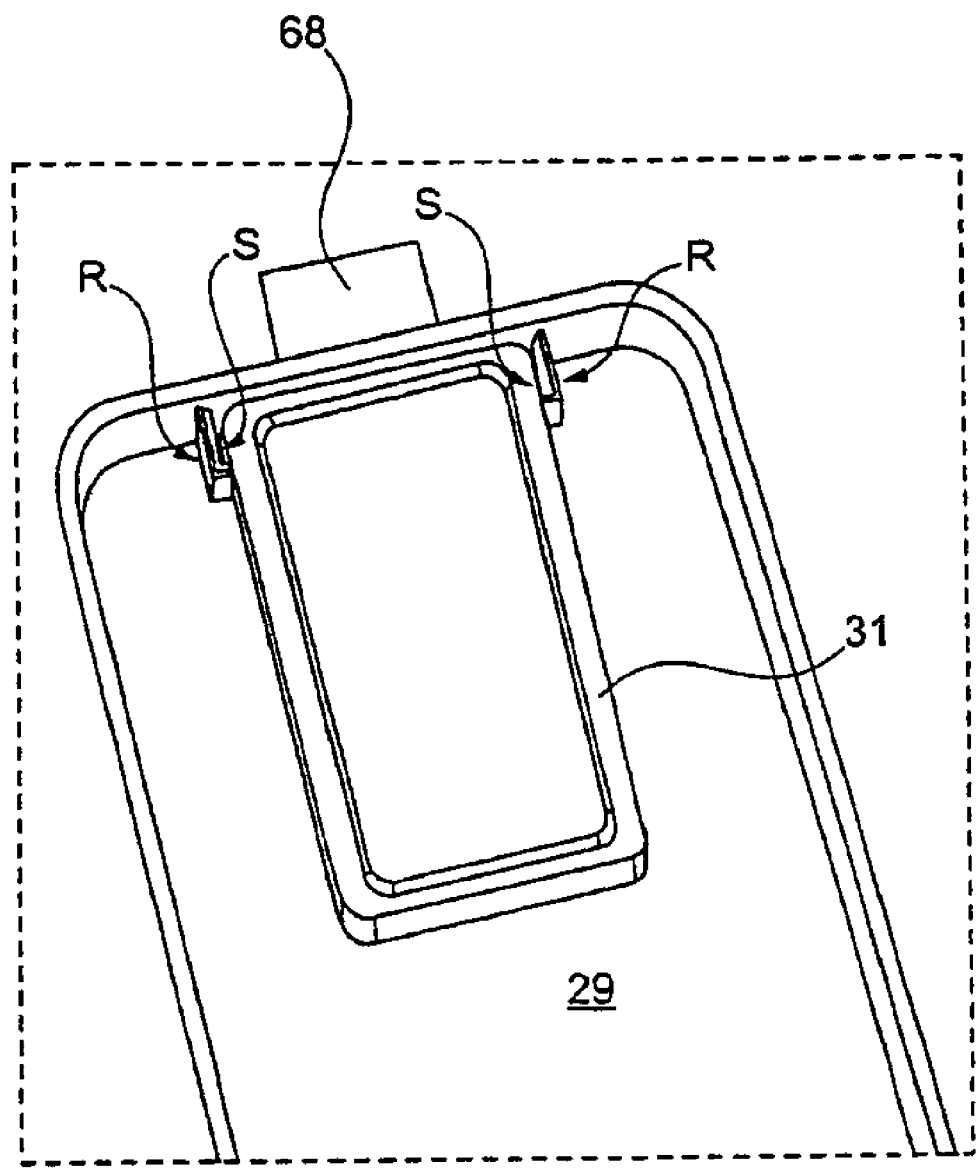
Figure 44:
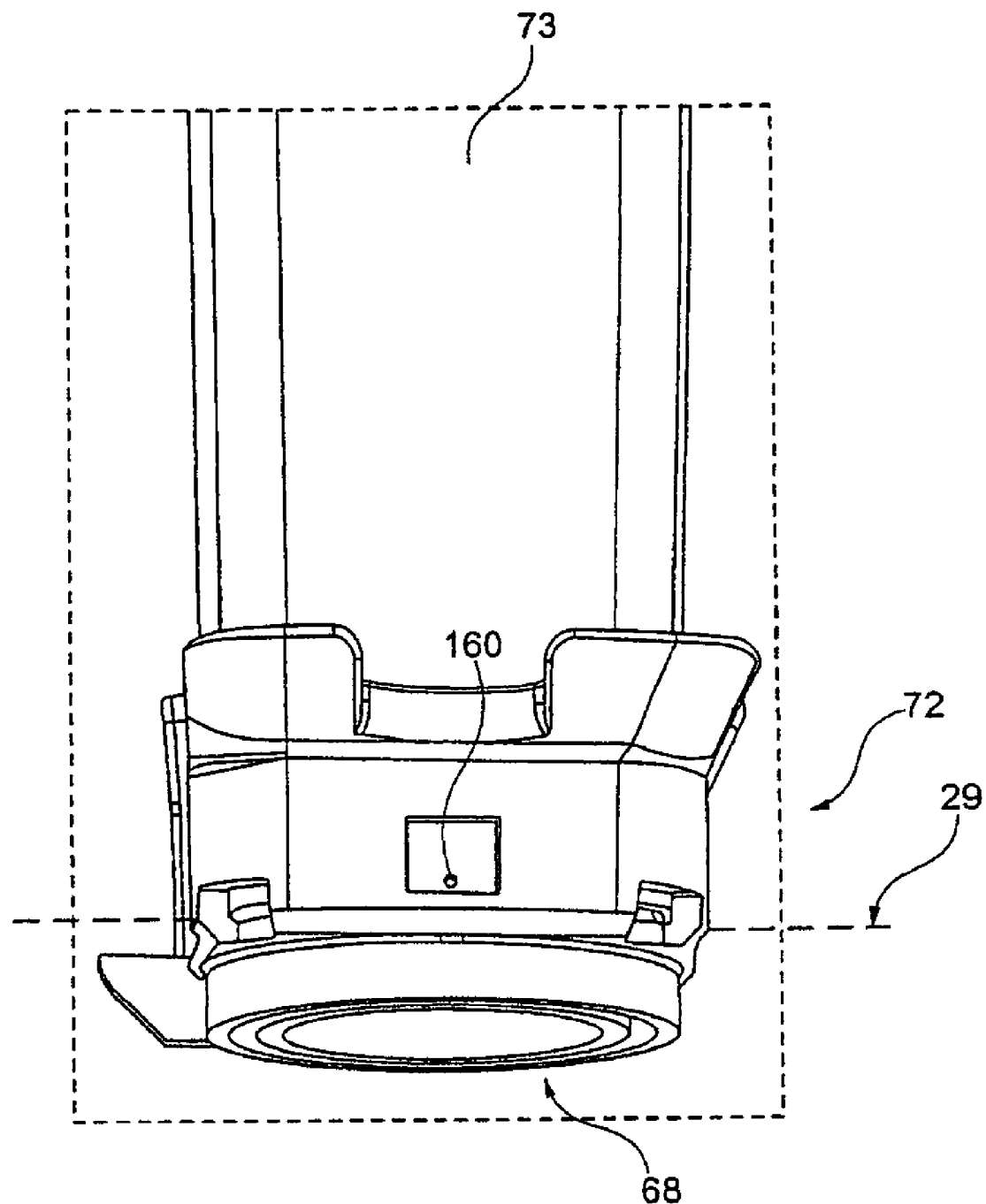
Figure 45:
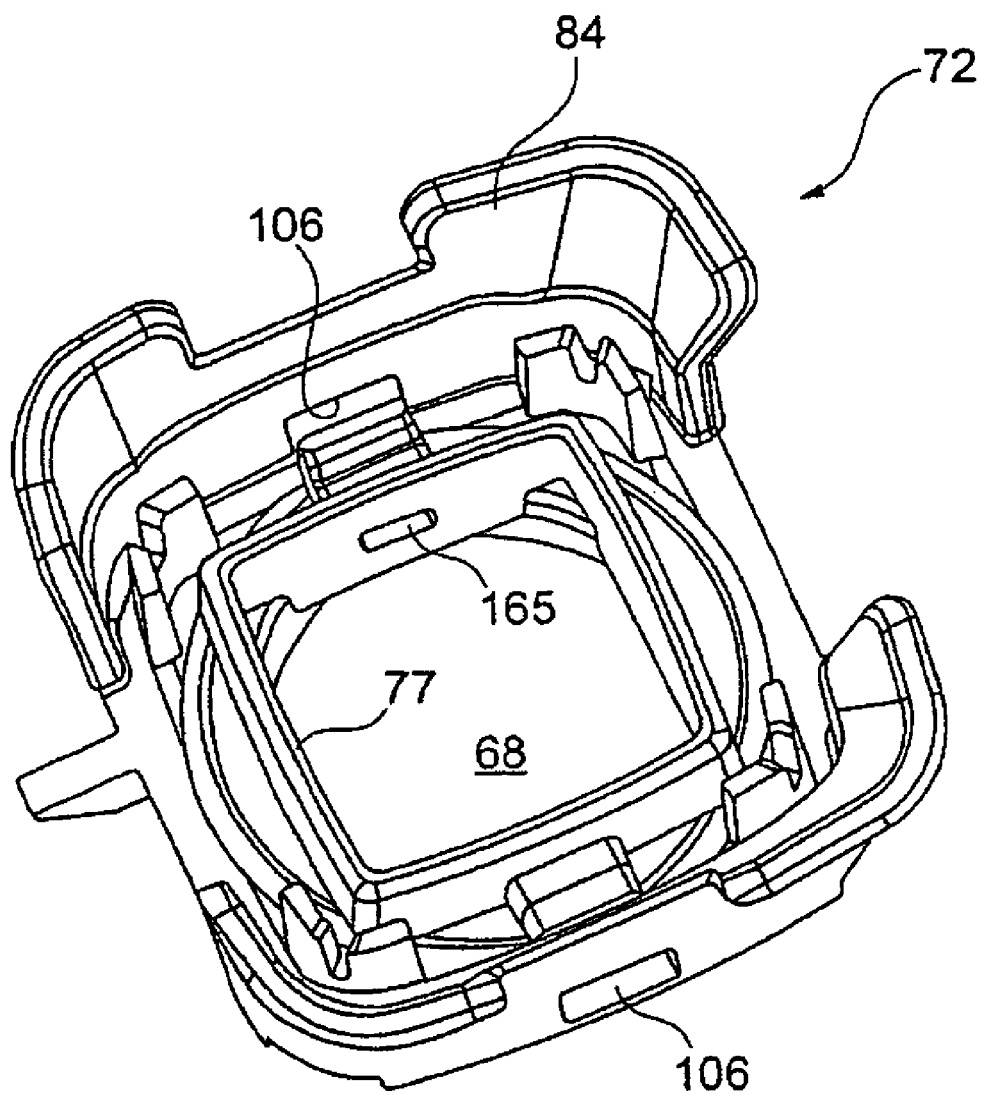
Figure 46:
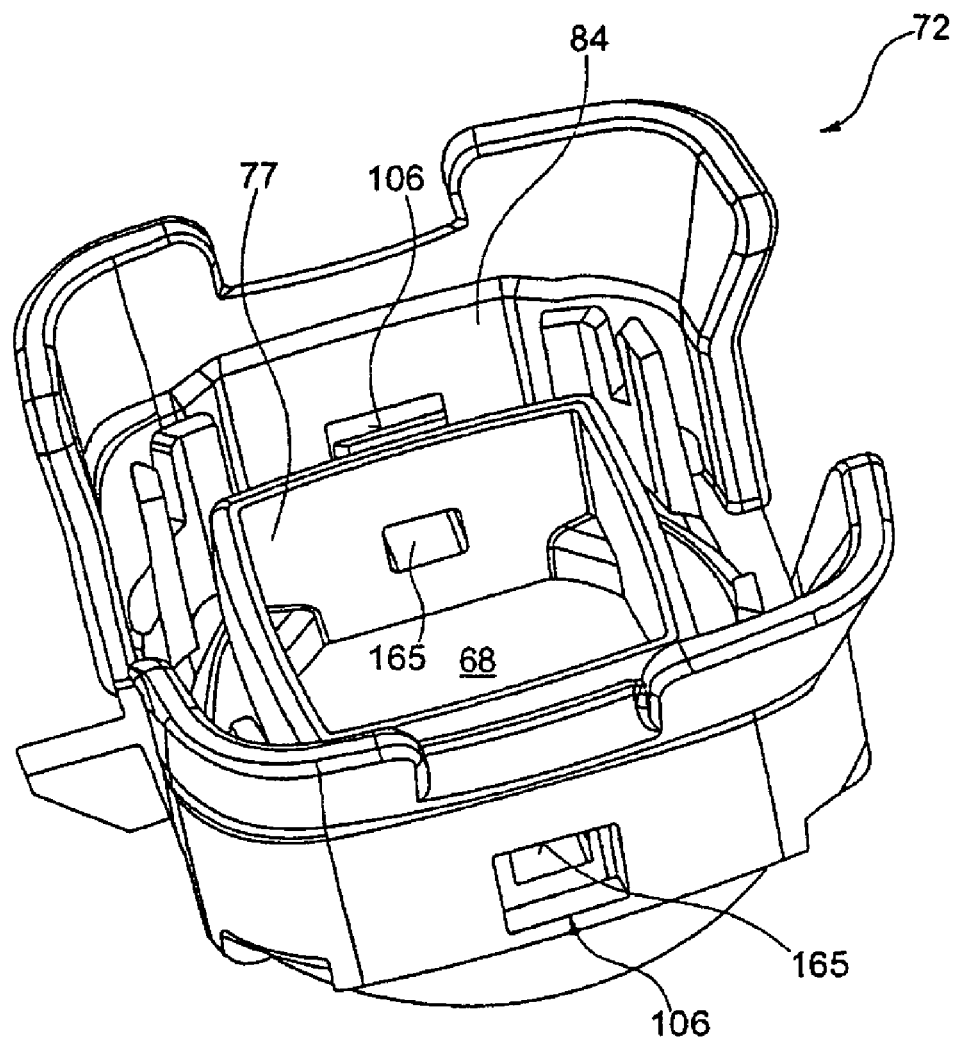
Figure 47:
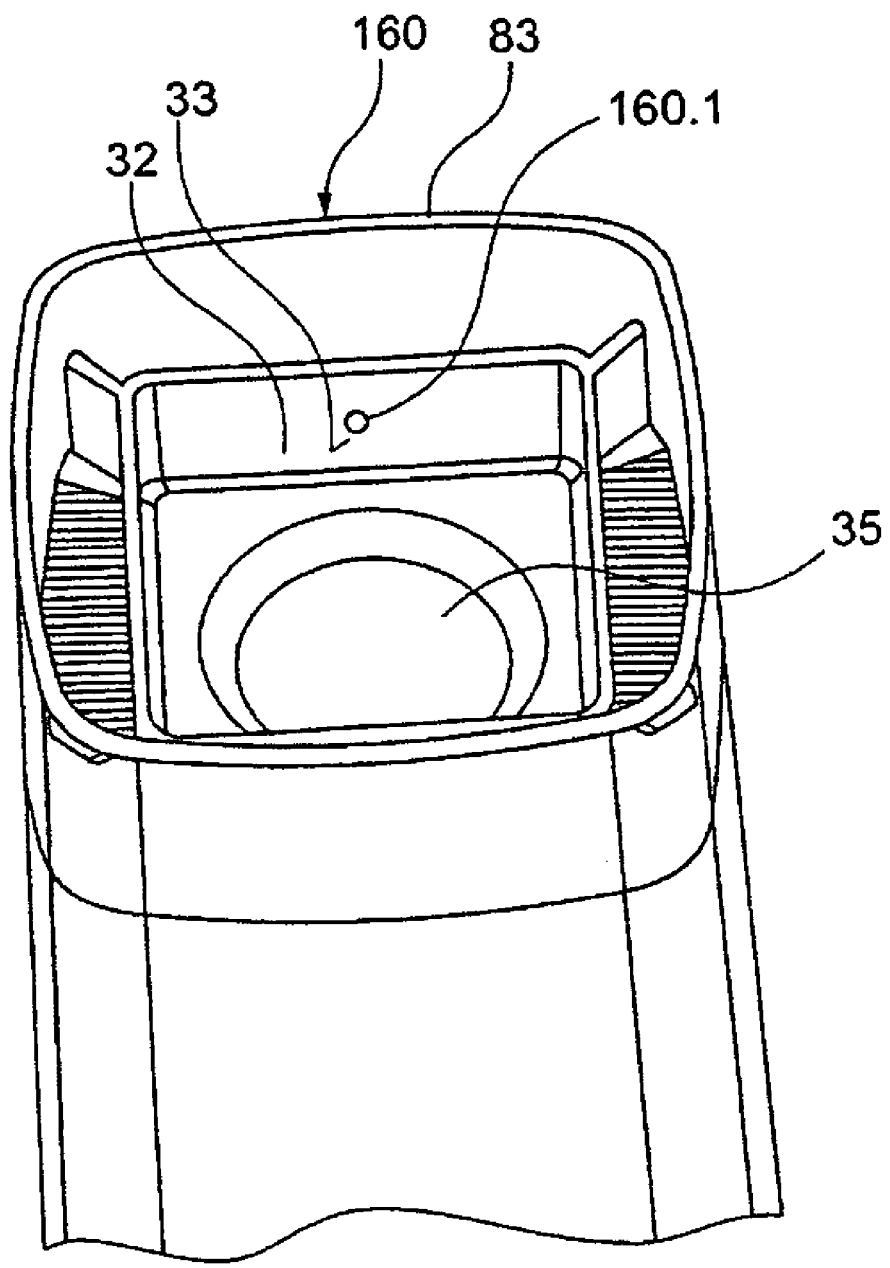

FIGS. 41 to 43 illustrate a further embodiment in which the filter 31 is inserted into the interior of the tank along a guide which is arranged on a tank wall, has two ribs R formed at an angle, and engages in two complementary slots R. In its bottom 29, the tank has a polygonal, in this case hexagonal, filter connecting element 23 and a tank outlet opening 35, which is passed to the exterior through the tank wall from within this connecting element.

In order on the one hand to allow sufficient water to be passed out through this tank outlet opening 35, which is formed on the wall side, and on the other hand to allow the tank to be emptied as completely as possible, the polygonal connecting element 23 is formed on the tank bottom with a polygon inclined on its upper face. The filter-side tank connecting element 32 in the form of a conical, likewise polygonal, molded seal 32 has a correspondingly complementarily inclined connecting surface. The filter cartridge 31 can be passed through this and, fixed by the ribs R and complementary slots S, can be inserted vertically on the tank wall downwards into the interior of the tank and can be inserted in an interlocking and sealed manner through the coding structure formed in this way with the tank bottom for filtering of the water that is located in the tank.

In this embodiment as well, as in the case of all the other embodiments apart from this as well, a bypass structure, which is not illustrated here, can preferably be provided in order to allow blending of the filtered water. A supplementary structure R, which is in the form of ribs, and a complementary coding structure S, which is in the form of slots, are provided here by the end recess S in the filter wall and the complementary shape R of the outlet opening 35 in the bottom area of the tank wall. These can also be modified appropriately, for example to a structure which has a quadrilateral shape, a triangular shape or other structure having further recesses and/or projections, in order to distinguish between different permissible filter types.

A further embodiment of quadrilateral coding for a tank/filter connection is illustrated in FIGS. 44 to 47. In addition to the embodiment illustrated in FIGS. 6 to 17, this embodiment has a bypass structure. This bypass structure comprises an opening in the form of a hole 129 in the end housing extension of the filter cartridge 73, which opening is coincident with an opening 165 that is formed in a tank-side filter fitting connecting element 77, allowing untreated water that is located in the tank to flow through to the tank-side appliance connection in the outlet area of the tank, for mixing with the water that has been filtered by the filter cartridge. In this case, on the filter side, the bypass opening 129 is formed in the end extension of the filter and provides a blending apparatus in conjunction with the tank-side filter connecting element 77.

A further possible way to provide a blending apparatus could be achieved by the arrangement of this bypass opening 129 opposite an opening 106 formed in the outer shell 51, in which case it may then be necessary to provide a corresponding channel guide in the interior of the filter cartridge and/or in the interior of the tank-side connecting element, in order to mix the blending water released in this way with the filtered water which flows through the filter cartridge and out of its outlet-flow opening 35.

A further blending structure can be provided by forming a bypass opening 129.1 in the polygonal filter-side tank connecting element 32, in this case in the form of a quadrilateral molded seal 32, which in turn corresponds to the opening 165 that is formed in the tank-side filter connection 77. The size of the opening 161.1 in this case once again governs the blending amount. In this embodiment, the blending apparatus is provided directly in the sealing area of the polygonal tank/filter connection.

Figure 48:
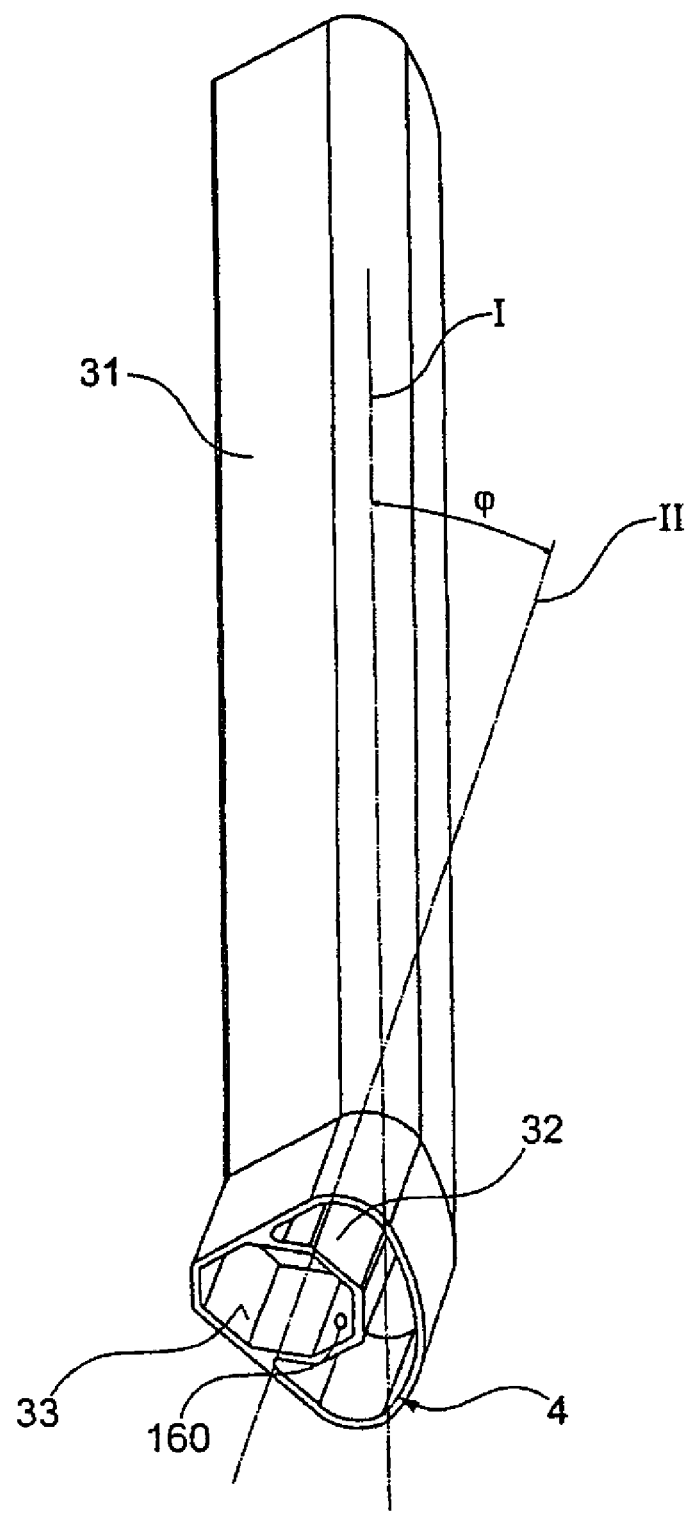
Figure 49:
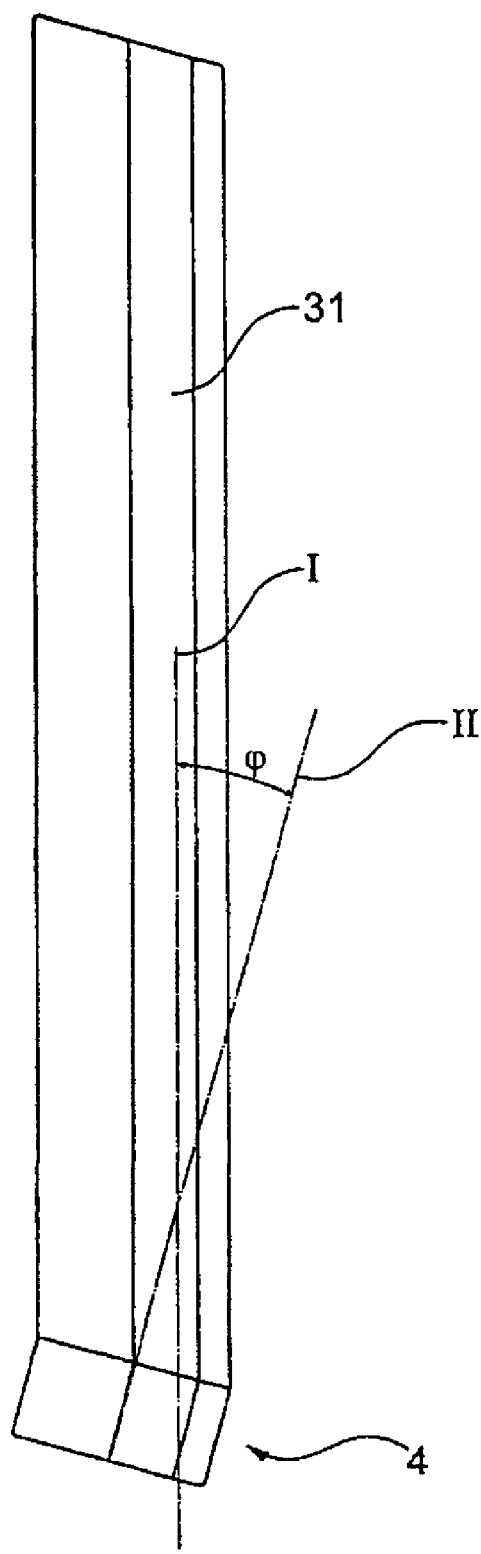

FIGS. 48 and 49 show an embodiment of a tank/filter connection in which a longitudinal axis II which runs through the filter-side tank connecting element 4 is aligned at an inclined angle with respect to a longitudinal axis I which runs through the housing of the filter cartridge 31, in this case preferably at an acute angle φ. This inclined-angle or else bent or else oblique alignment of the filter-side tank connecting element 4 with respect to the rest of the filter housing provides a further form of mechanical coding which can be combined with further coding forms as already described above, in particular with a polygonal connecting element as illustrated here, in the form of an octagon. This octagon can preferably likewise be in the form of a molded seal and, as illustrated here, may have a bypass or blending apparatus in the form of an opening 129 which, when a complementary element is present in the tank-side filter connecting element, allows corresponding blending of the water to be filtered.

FIG. 48 shows the filter cartridge 31 in an oblique view from underneath, in which the filter-side connecting element 4 and its major features can be seen. In contrast, FIG. 49 shows a side view, in which the angle between the cartridge housing 31 and the filter-side tank connection 4 is shown for one angle, which is illustrated by way of example.

Figure 50:
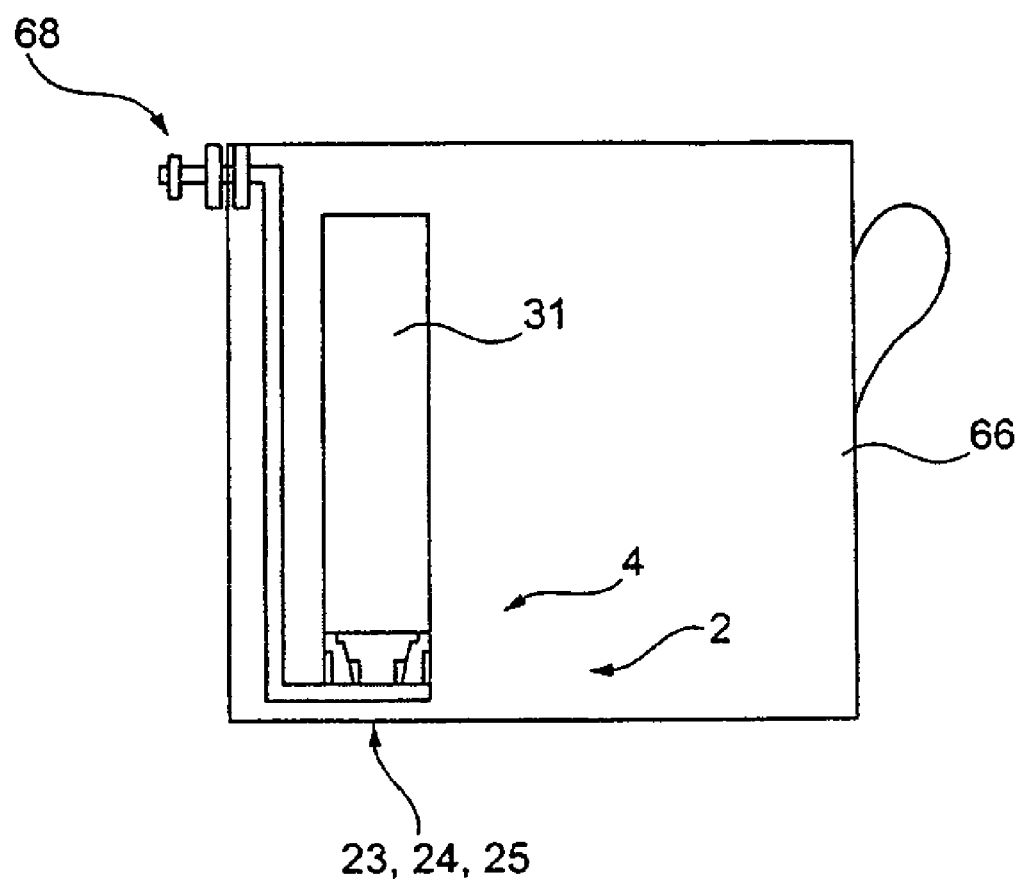

FIG. 50 shows a further embodiment in which the tank 66 is once again in the form of a push-in tank, in which a cartridge 31 for filtering the water contained therein is connected to a tank-side filter connecting element 2. This tank-side connecting element 2 is connected via a line, in this case preferably in the form of a robust tube, to the tank-side appliance connection 68. This tank-side appliance connection 68 is passed to the outside from the tank interior at a distance from the bottom area of the tank 66 during operation. In this embodiment, by way of example, the appliance connection 68 is fixed in a holder which is incorporated in the upper edge of a tank wall and may advantageously be in the form of a detachable connection, so as to allow simple removal and cleaning.

The tank can be operated simply by pushing it into a correspondingly designed receptacle in an appliance, and it can be filled with fresh water, which will then be filtered by the filter 31, by pulling it out. The tank-side filter connecting element 2 can in this case have all the coding and/or fixing and/or sealing features described above in such a way that, even in this second drawer embodiment, the use of a filter cartridge which is not provided correctly can be reliably precluded, and, apart from this, this also applies to the embodiment shown in FIGS. 41 to 43.

Figure 51:
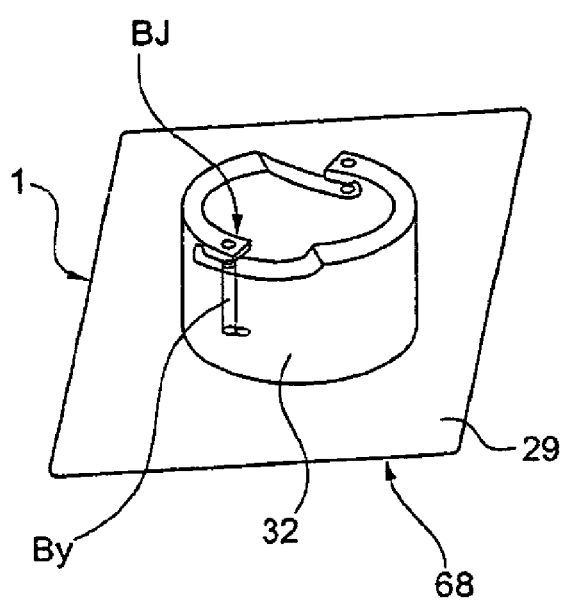
Figure 52:
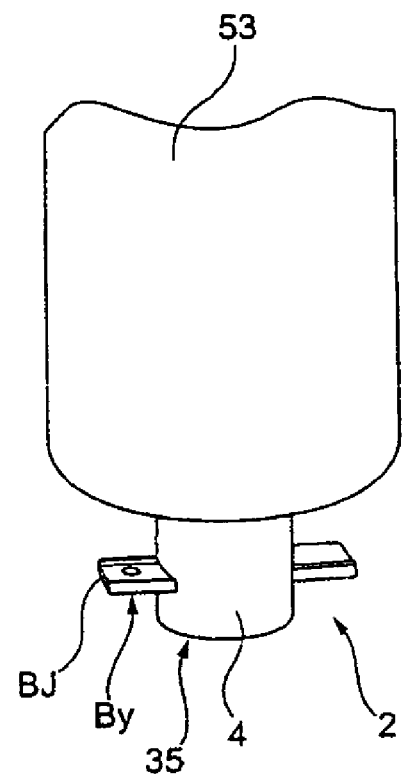

Two further embodiment options relating to a bypass configuration between a tank-side filter connecting element 1 and a filter-side tank connecting element 2 are illustrated in FIGS. 51 to 54. FIGS. 51 and 52 in this case show, by way of example and schematically, a bypass arrangement BY which allows blending between water that has been filtered by the filter cartridge 53 and water which has not been filtered or prepared or has been filtered or prepared in a different manner. The bypass or blending section BY is in this embodiment combined with a bayonet fitting BJ such that an opening BY is provided in one bayonet vane BJ and corresponds with a further bypass opening BY, which is arranged on a bayonet slot BJ which is complementary to the bayonet vane, such that, when a filter cartridge is inserted correctly, a corresponding bypass route is provided. In the embodiment illustrated here, the bypass opening BY which is shown in the tank-side filter connecting element 1 is passed from the end connecting area of the tank-side connecting fitting to below the point at which the filter-side tank connecting stub 4 ends in the correctly inserted position, such that the bypass water which bypasses the filter bed of the filter cartridge 53 is mixed with the water that has been filtered by the filter bed in the filter cartridge 53, and is supplied to the tank-side appliance connection 68.

Figure 53:
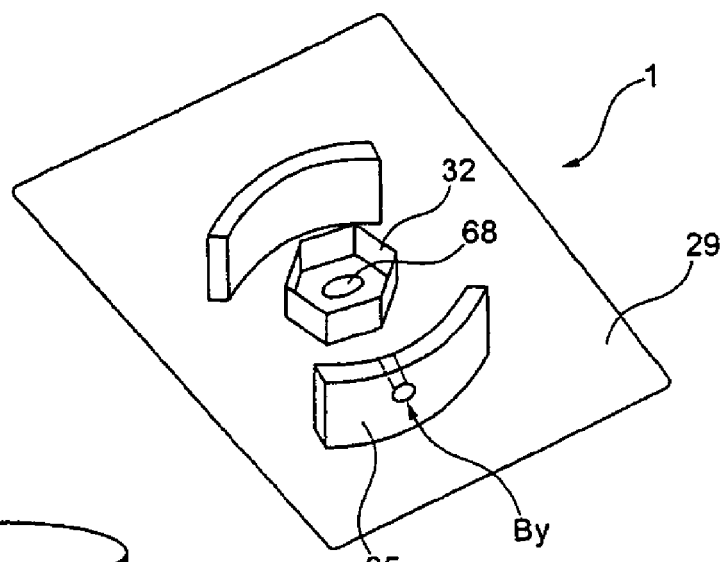
Figure 54:
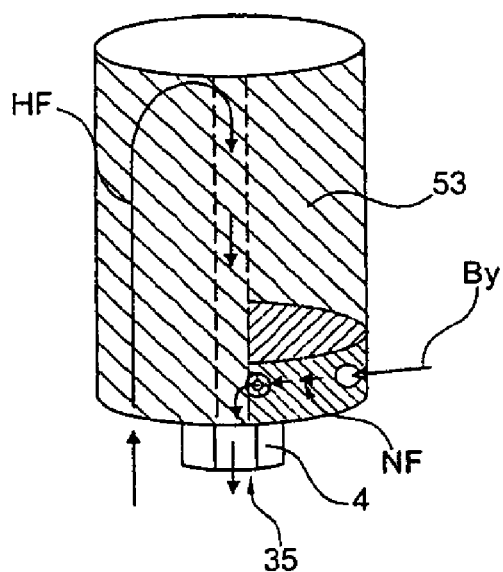

FIGS. 53 and 54 show an embodiment that has been modified in comparison to this, in that the bypass path BY is routed via a preparation and/or filter path, which is separate from a main filter bed HF of the filter cartridge 53 and is illustrated in this case by way of example and symbolically as a secondary filter path NF. This second preparation and/or filter path NF may, for example, contain an activated-carbon filter path and/or other preparation mechanisms and/or media. After passing through this secondary filter path NF, the water which has been passed via this bypass path BY is mixed with the water which has been filtered by the filter path HF in the filter cartridge 53 such that it can likewise be drawn off through the tank-side appliance connection 68.

In the embodiment of the filter cartridge 53 as shown in FIG. 54, the combination of the two water paths, which have been passed and prepared separately via the main filter HF and via the secondary filter NF respectively, in the interior of the filter cartridge 53 is illustrated, by way of example and schematically, by an opening into the inner falling line of the filter cartridge 53. In a modified embodiment, however, a dedicated outlet opening from the filter cartridge in the direction of the tank-side appliance connection 68 can invariably also be provided, in addition or as an alternative, in which case it can possibly be said for all three embodiments that they all open within the tank-side filter connecting stub 32 such that, once again by way of example, sealing is possible by an interlock between the two polygonal connecting elements of the tank and of the filter.

The bypass flow can be introduced into the secondary filter path only when the opening BY, which likewise acts as coding, on the coding element 25, which projects axially upwards from the tank bottom 29, with the corresponding filter-side bypass opening BY is inserted in the state intended for operation. If these two openings do not coincide, then no corresponding blending can take place. The tank-side filter connection 1 corresponding to FIG. 53 is likewise illustrated only schematically and by way of example and can be provided with widely different variants of the coding and connecting structure already described above such that, if required, only a single one of all six angular alignments that are possible here is allowed for a permissible filter termination. Such coding structures have not been illustrated at this point, for clarity reasons.

In principle, it can also be said for these embodiments in FIGS. 51 to 54 that they can also be combined with all of the coding and/or fixing and/or sealing structures described above.

Figure 55:
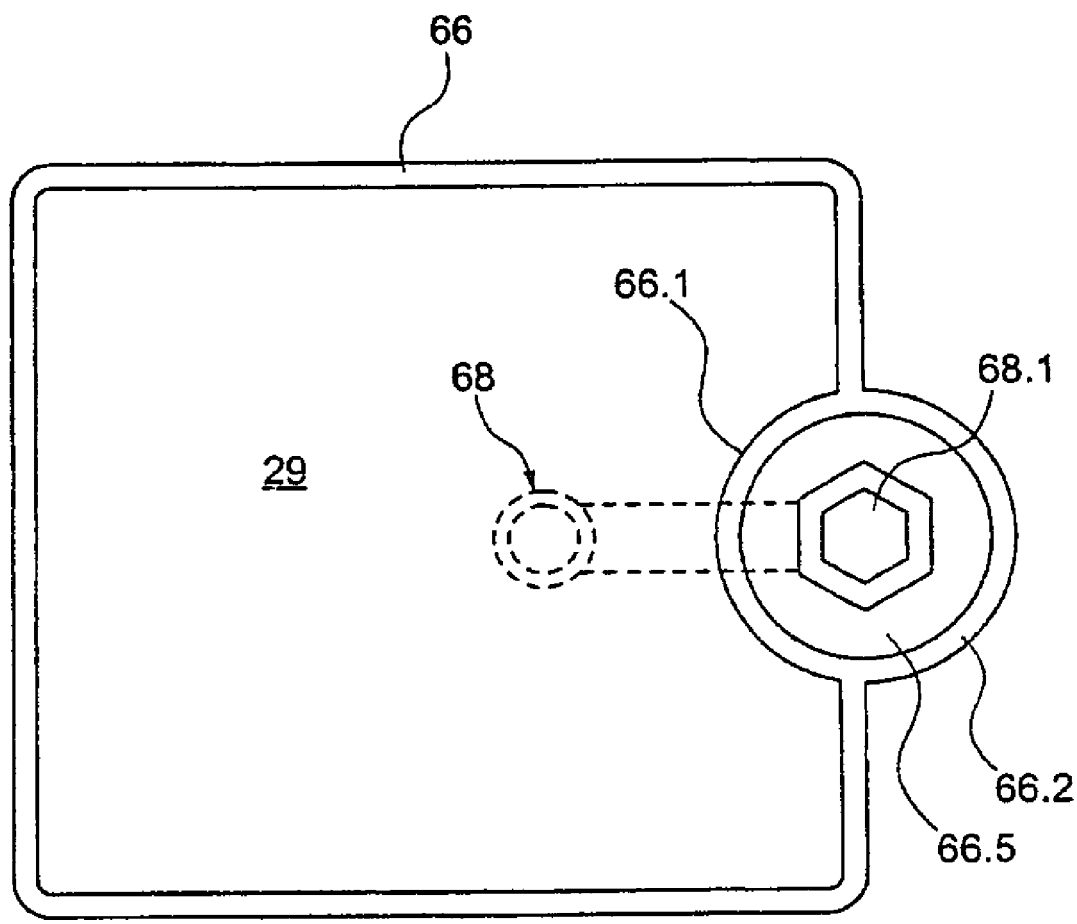
Figure 56:
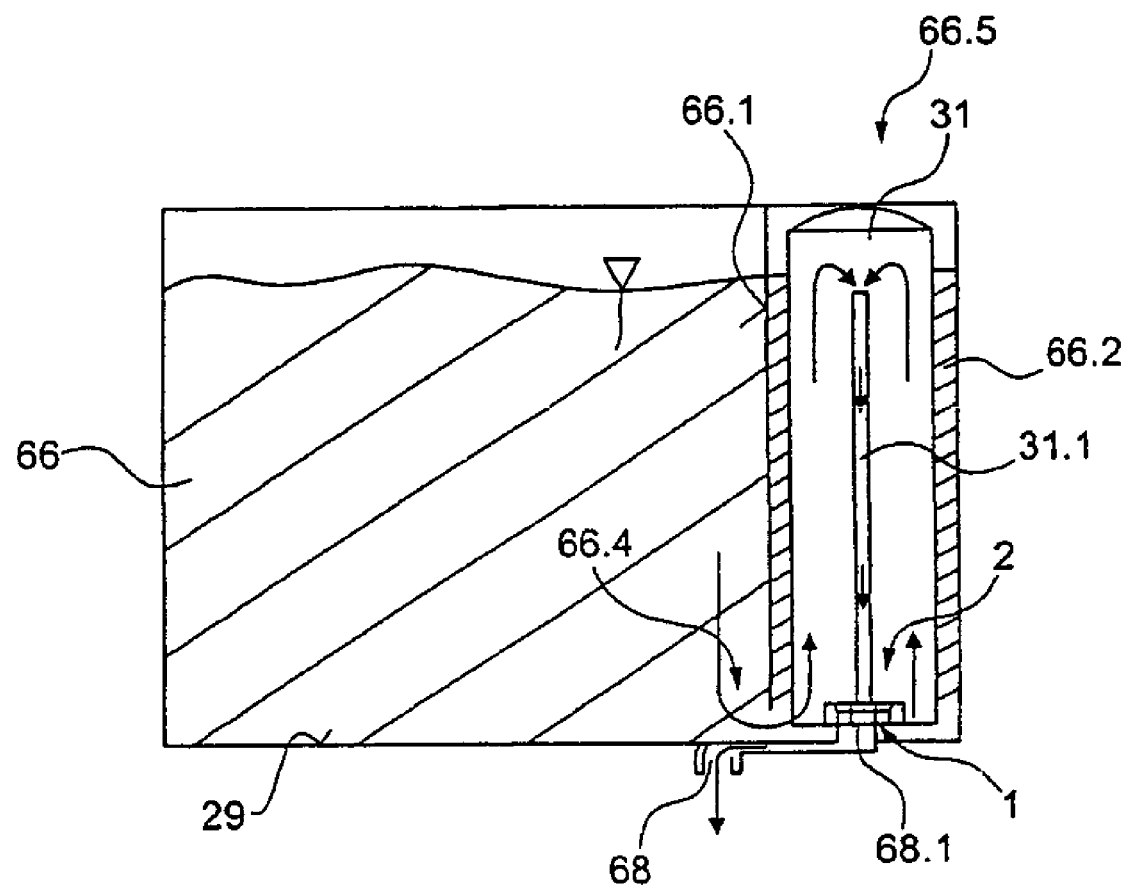
Figure 57:
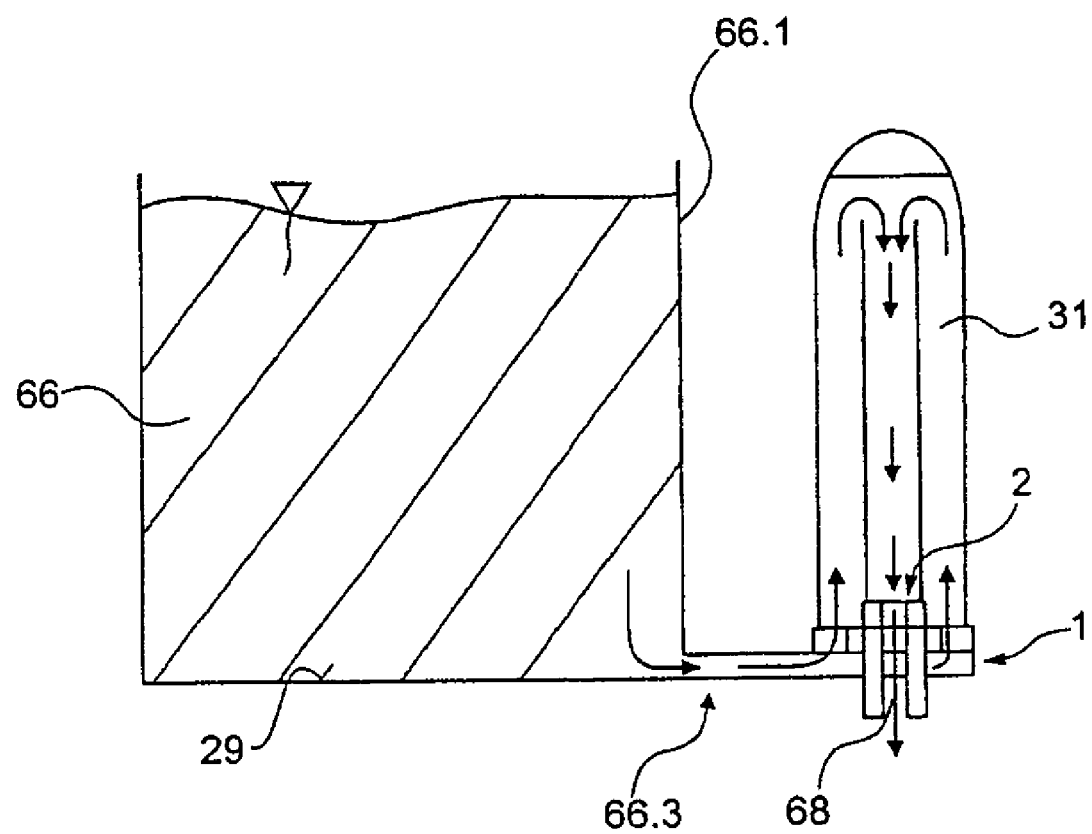

FIGS. 55 to 57 show two further embodiments of a tank in which the filter cartridge is arranged outside the main vessel of the tank 66 but still, as described above, between the tank-side filter connecting element 1 and a tank-side appliance connection 68, in order to filter untreated water that is stored in the tank before supplying it to an extraction point or to a correspondingly connected appliance, with or else without blending.

FIG. 55 in this case shows a plan view of a tank 66, whose tank wall 66.1, together with a further tank wall 66.2, forms a housing 66.5 for holding a correspondingly shaped filter cartridge 31, and which is connected, such that liquid can be carried, to the interior of the tank. A tank-side filter connecting element 1 is shown in the bottom area of the housing 66.5, in this case by way of example as a coded connecting structure in the form of a polygonal contour. An outlet-flow opening 68.1 for connection to the tank-side appliance connecting element 68 is provided in the interior of this tank-side filter connecting element 1.

FIG. 56 shows this tank 66 in the form of a sectional illustration transversely through the filter cartridge holding housing 66.5, and the adjacent elements of the tank, as well as the connecting structure formed underneath it for the tank-side appliance connecting element 68. In this embodiment, by way of example, the tank could be in the form of a plug-in tank installed in a correspondingly suitably designed appliance. The water with which the interior of the tank 66 has been filled is supplied to the filter cartridge 31 through an opening 66.4 in the tank wall 66.2 which, for example, may be in the form of a tank wall 66.1 which does not extend all the way to the tank bottom 29. The untreated water to be filtered is thus of the same height in the interior of the filter holding housing 66.5, which is formed by the two tank walls 66.1 and 66.2, as in the interior of the water tank 66. The filter flow through the filter cartridge from the interior of the tank 66 and from the bottom of the filter cartridge 31, rising to the upper edge of an outlet-flow line, which is shown here by way of example as a central outlet-flow pipe 2, through this and finally out of the tank-side appliance connection 68 is illustrated by flow arrows. All the features described above in the description so far, with regard to coding and/or fixing and/or sealing and/or the use of an adapter piece and/or the like, are also completely possible and applicable here.

FIG. 57 shows an embodiment in which the connection which carries liquid between the tank-side filter connecting element 1 and the filter-side tank connecting element 2 is provided completely outside the tank 66. For this purpose, by way of example, the tank bottom 29 is developed at a point opposite a tank wall 66.1 such that it is drawn outwards and is shaped to form a closed liquid line 66.3, through which the water which is located in the interior of the tank 66 flows to the tank-side filter connecting element 1 which, in this embodiment that is illustrated by way of example, is formed outside the tank 66. The filter-side tank connecting element 2 of the filter cartridge 31 is connected to this tank-side filter connecting element 1. It can also be said for this embodiment that all of the features that have already been described above with regard to a coding and/or sealing and/or fixing and/or adapter structure can be provided in and are applicable to any embodiment variant.

LIST OF REFERENCE SYMBOLS

1 Connecting fitting
2 Tank connecting element
3
4 Connecting stub
5
6 Side slot
23 Connecting fitting
24 Sealing surface
25 Outer shell
26 Blocking element
27 Bottom rib
28 Bottom rib
29 Tank bottom
30 Inner rib
31 Filter cartridge
32 Molded seal
33 Sealing surface
34 Inlet slot
35 Outlet-flow opening
36 Filter cartridge housing
37 Snap-action element
38 Receptacle
39 Lower edge
40 Stop
41 Bottom opening
42 Grooves
43 Key element
44 Tank connecting area
45 Bottom
46 Axial seal
47 Separating line
48 Disk
49 Annular shoulder
50 Valve body
51 Spring
52 Tank bottom
53 Filter cartridge
54 Connecting fitting
55 Outer surface
56 Outlet-flow line
57 Seal
58 Wall
59 Wall
60 Cutout
61 Opening
62 Fitting wall
63 Fitting wall
64 Fitting wall
65 Bypass opening
66 Tank
67 Suction connection
68 Appliance connection
69 Longitudinal axis
70 Intermediate space
71 Rim
72 Connecting element
73 Cartridge
74 Foot
75 Inlet opening
76 Inlet opening
77 Connecting fitting
78 Baseplate
79 Sealing surface
80 Sealing surface
81 Molded seal
82 Outlet
83 Outer wall
84 Outer shell
85 Adapter
86 Adapter

The invention claimed is:

1. A water filter cartridge (31) having a connecting element (4) and a filter output wherein the improvement comprises a combined coding, sealing and fixing element with a polygonal circumferential contour having a plurality of angular fixing and sealing surfaces in axial alignment with the filter output which when joined with a corresponding element having a plurality of angular fixing and sealing surfaces forms a seal (32) between the respective sealing surfaces with the polygonal contour disposed on an internal and/or an external and/or an axial circumferential surface of the coding sealing and fixing element.

2. The water filter cartridge as claimed in claim 1 wherein the combined coding, sealing and fixing element forms a projection (4, 57) which can be plugged into and/or onto a corresponding tank connecting element.

3. The water filter cartridge as claimed in claim 1 or 2 wherein the combined coding, sealing and fixing element has a recess (33) for holding a corresponding tank connecting element.

4. The water filter cartridge as claimed in claim 1 or 2 wherein the seal has a cross section which is not round.

5. The water filter cartridge as claimed in claim 1 or 2 wherein the seal has a partially oval cross section.

6. The water filter cartridge as claimed in claim 1 or 2 wherein the seal has a cross sectional taper extending in the axial direction.

7. The water filter cartridge as claimed in claim 1 or 2 wherein the seal is a molded seal.

8. The water filter cartridge as claimed in claim 1 or 2 wherein the connecting element has grooves (N) and/or ribs (R).

9. The water filter cartridge as claimed in claim 1 wherein the seal is disposed on the internal contour of the polygonal circumferential contour of the combined coding, sealing and fixing element.

10. The water filter cartridge as claimed in claim 1 wherein the seal is disposed on the external contour of the polygonal circumferential contour of the coding, sealing and fixing element.

11. The water filter cartridge of claim 1 wherein the combined coding, sealing and fixing element and the seal have a rotationally symmetrical cross section.

12. The water filter cartridge of claim 11 wherein the combined coding, sealing and fixing element and the seal have a blending opening.

13. The water filter cartridge of claim 12 wherein the blending opening provides a secondary filter path for blending water filtered in an alternative filter path in the filter cartridge.

14. A water filter cartridge comprising:
(a) a water filter cartridge housing having an outlet and a connecting element having an internal and/or external angular circumferential sealing and fixing surface having a cross-sectional taper extending in the axial direction in the form of a polygon with an interconnected angular shaped perimeter in axial alignment with the outlet;
(b) wherein an angular shaped seal having a cross-sectional taper extending in the axial direction disposed circumferentially around the connecting element is formed by joining said connecting element with a corresponding connecting element having a polygonal configuration; and
(c) a blending or bypass port disposed in the water filter cartridge.

15. The water filter cartridge of claim 14 wherein the blending or bypass port is disposed in the angular shaped circumferential surface of the connecting element and the connecting element has a rotationally symmetrical cross section.

16. A filter cartridge comprising:
(a) a filter cartridge housing having an output end;
(b) a polygonal coding, sealing and connecting element having an internal and/or external polygonal circumferential surface with interconnected sides forming a polygonal shaped perimeter disposed in axial alignment with the output end;
(c) wherein a polygonal shaped seal having a plurality of angles disposed on the polygonal coding connecting element is formed by joining said polygonal coding sealing and connecting element with a corresponding polygonal coding sealing and connecting element; and
(d) a plurality of ribs and/or slots to provide a plurality of different coding and interlocking points and surfaces for a tank side filter connecting element.

17. The filter cartridge of claim 16 further comprising a blending port disposed in said polygonal coding, sealing and connecting element.

* * * * *

UNITED STATES PATENT AND TRADEMARK OFFICE
CERTIFICATE OF CORRECTION

PATENT NO.      : 8,202,418 B2
APPLICATION NO. : 12/310071
DATED           : June 19, 2012
INVENTOR(S)     : Kurt Wallerstorfer et al.

Page 1 of 1

It is certified that error appears in the above-identified patent and that said Letters Patent is hereby corrected as shown below:

On the Title Page, Item (75), the address of one of the joint inventors, Mr. Roland Scholz should be:

Roland Scholz, Balgach (CH)

Signed and Sealed this
Sixth Day of January, 2015

Michelle K. Lee
*Deputy Director of the United States Patent and Trademark Office*